US007505986B2

(12) United States Patent
Havewala et al.

(10) Patent No.: US 7,505,986 B2
(45) Date of Patent: Mar. 17, 2009

(54) MOVING DATA FROM FILE ON STORAGE VOLUME TO ALTERNATE LOCATION TO FREE SPACE

(75) Inventors: Sarosh Cyrus Havewala, Redmond, WA (US); Guhan Suriyanarayanan, Redmond, WA (US); Christophe Franck Robert, Newcastle, WA (US); Shobana Balakrishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 331 days.

(21) Appl. No.: 11/181,536

(22) Filed: Jul. 14, 2005

(65) Prior Publication Data

US 2007/0016622 A1    Jan. 18, 2007

(51) Int. Cl.
*G06F 17/00* (2006.01)
(52) U.S. Cl. .................. 707/101; 707/102; 707/103 R; 707/104.1
(58) Field of Classification Search ............. 707/1–10, 707/100–104.1, 200–206
See application file for complete search history.

(56) References Cited

U.S. PATENT DOCUMENTS

| | | | |
|---|---|---|---|
| 5,412,791 A | 5/1995 | Martin et al. | 711/114 |
| 5,504,873 A | 4/1996 | Martin et al. | 711/111 |
| 5,832,526 A | 11/1998 | Schuyler | |
| 5,950,203 A | 9/1999 | Stakuis et al. | 707/10 |
| 6,119,131 A | 9/2000 | Cabera et al. | |
| 6,161,104 A | 12/2000 | Stakutis et al. | 707/10 |
| 6,499,039 B1 | 12/2002 | Venkatesh et al. | 707/204 |
| 6,600,967 B2 | 7/2003 | Milligan et al. | 700/214 |
| 6,694,317 B1 | 2/2004 | Stakutis et al. | 707/10 |
| 6,718,372 B1 | 4/2004 | Bober | |
| 6,795,904 B1 | 9/2004 | Kamvysselis | 711/162 |
| 7,010,554 B2 | 3/2006 | Jiang et al. | |
| 7,064,913 B2 | 6/2006 | Gunderson et al. | |
| 7,162,599 B2 | 1/2007 | Berkowitz et al. | |
| 7,275,059 B2 | 9/2007 | Stakutis et al. | |

(Continued)

FOREIGN PATENT DOCUMENTS

GB    2 397 936    8/2004

OTHER PUBLICATIONS

Office Action issued in related U.S. Appl. No. 11/181,439, dated Aug. 3, 2007, 13 pages.

(Continued)

*Primary Examiner*—Isaac M Woo
(74) *Attorney, Agent, or Firm*—Woodcock Washburn LLP

(57) ABSTRACT

A computing device has a storage volume, a file system managing the storage volume, and a file stored on the storage volume and accessed by such file system. The file system receives an open command for the file from an application, notes that the file has been ghosted in that data of the file has been moved to an alternate location, and returns an error. The returned error is intercepted and the file system is commanded to retrieve ghosting information from the ghosted file. A handle corresponding to the ghosted file is delivered to the application, and a read command for the file is received from the application, including the handle, an offset, and a read length. Reconstituting of the ghosted file is initiated based on the data thereof at the alternate location, and after reconstituting the read command is responded to with the data requested.

20 Claims, 13 Drawing Sheets

U.S. PATENT DOCUMENTS

| | | | |
|---|---|---|---|
| 7,293,044 | B2 | 11/2007 | Ghotge et al. |
| 2002/0062167 | A1 | 5/2002 | Dimitri et al. ............... 700/214 |
| 2004/0039891 | A1 | 2/2004 | Leung et al. ................ 711/165 |
| 2004/0162939 | A1 | 8/2004 | Barlett ....................... 711/111 |
| 2004/0172423 | A1 | 9/2004 | Kaasten et al. ............. 707/201 |
| 2004/0218305 | A1 | 11/2004 | Donkin et al. ................ 360/92 |
| 2005/0066310 | A1 | 3/2005 | Creamer et al. ............ 717/127 |
| 2005/0120107 | A1 | 6/2005 | Kagan et al. |
| 2005/0182769 | A1 | 8/2005 | Fujiita et al. |
| 2005/0251516 | A1 | 11/2005 | Stakutis et al. |
| 2006/0020646 | A1 | 1/2006 | Tee et al. |
| 2007/0208756 | A1 | 9/2007 | Stakutis et al. |

OTHER PUBLICATIONS

Reply to Office Action (item # 1 above) in related U.S. Appl. No. 11/181,439, dated Nov. 5, 2007, 12 pages.

In the United States Patent and Trademark Office, Non-Final Office Action in re: U.S. Appl. No. 11/181,440 dated Oct. 30, 2007, 12 pages.

In the United States Patent and Trademark Office, Non-Final Office Action in re: U.S. Appl. No. 11/181,063 dated Oct. 30, 2007, 12 pages.

In the United States Patent and Trademark Office, Non-Final Office Action in re: U.S. Appl. No. 11/181,435 dated Dec. 11, 2007, 16 pages.

In the United States Patent and Trademark Office, Notice of Allowance in re: U.S. Appl. No. 11/181,089 dated Nov. 27, 2007, 11 pages.

Reply to Office Action in U.S. Appl. No. 11/181,435, Feb. 25, 2008, 8 pages.

Reply to Office Action in U.S. Appl. No. 11/181,440, Jan. 30, 2008, 10 pages.

Reply to Office Action in U.S. Appl. No. 11/181,063, Jan. 30, 2008, 9 pages.

In the United States Patent and Trademark Office, Notice of Allowance in re:. U.S. Appl. No. 11/181,439 dated Feb. 22, 2008, 13 pages.

In the United States Patent and Trademark Office, Non-Final Office Action in re: U.S. Appl. No. 11/181,435 dated Jun. 23, 2008, Filed Jul. 14, 2005, 17 pages.

NON-GHOSTED FILE 14

- METADATA 22
-- LOGICAL FILE SIZE
-- SIZE ON VOLUME 12
-- CREATE TIME
-- MODIFY TIME
-- ACCESS TIME
-- ACCESS PERMISSIONS
-- FILE ATTRIBUTES

- DATA 20
-- PRIMARY DATA 20
-- ALTERNATE DATA 20

GHOSTED FILE 14

- METADATA 22
-- LOGICAL FILE SIZE [SAME]
-- SIZE ON VOLUME 12 [LESS]
-- CREATE TIME
-- MODIFY TIME
-- ACCESS TIME
-- ACCESS PERMISSIONS
-- FILE ATTRIBUTES
--- GHOSTED ATTRIBUTE
-- GHOSTING INFO 24
--- ID
--- STORAGE

- DATA 20
-- ALTERNATE DATA 20

SINK 18

- ID
-- NON-GHOSTED FILE 14

FIG. 3B

MOVING DATA FROM FILE ON STORAGE VOLUME TO ALTERNATE LOCATION TO FREE SPACE

CROSS-REFERENCE TO RELATED APPLICATIONS

The present application shares a common disclosure with:
U.S. patent application Ser. No. 11/181,435 filed Jul. 14, 2005, and
U.S. patent application Ser. No. 11/181,089 filed Jul. 14, 2005, and
U.S. patent application Ser. No. 11/181,439 filed Jul. 14, 2005, and
U.S. patent application Ser. No. 11/181,440 filed Jul. 14, 2005, and
U.S. patent application Ser. No. 11/181,063 filed Jul. 14, 2005,
all of which are filed concurrently with the present application, and all of which are hereby incorporated by reference in their entirety.

TECHNICAL FIELD

The present invention relates to an architecture and methods that allow data from a computer file stored on a storage volume to be moved or 'ghosted' to an alternate location to free space on the storage volume. More particularly, the present invention relates to such an architecture and methods whereby the remainder of the ghosted file stays on the storage volume and the ghosted data at the alternate location can if necessary be retrieved and placed back into the ghosted file to result in a de-ghosted file.

BACKGROUND OF THE INVENTION

In a computing device such as a personal computer, a computer server, or the like, and as is known, data is typically persistently stored on the computing device in the form of local computer files resident on one or more local storage volumes of the computing device. Each such storage volume may reside on a hard drive of the computing device or the like, and such storage volume may be organized by, accessed through, and otherwise controlled by a file system running on the computing device, as is also known.

At times, it can be the case that some, many, and perhaps even most of the computer files on the storage volume are not of interest and can be considered to have become 'cold'. That is to say, such cold files have not been accessed for some extended length of time and/or likely will not be accessed for some extended length of time, for example, and therefore have little if any real value in remaining on the volume.

Of course, such cold files could simply be deleted from the storage volume, especially if there is a need for space on such volume. However, it is to be appreciated that most users are loathe to delete files simply to create space. In addition, it is considered bad practice to delete a cold file merely because of perceived disuse. At any rate, it can and likely will be the case that a cold file though not considered needed and not foreseen as needed may nevertheless become needed at some future point.

In such a situation, then, it would be useful to be able to create space on the volume by moving data from such cold files to an alternate location, while still allowing such cold files to maintain a presence on the volume. That is, it would be useful to be able to 'ghost' a cold file by moving data from such cold files to the alternate location or to copy the entire file to the alternate location, while leaving the cold file in a smaller, 'ghosted' form on the volume. Thus, if in fact the ghosted file is needed on the computing device, the data for such ghosted file may be retrieved from the alternate location, the ghosted file may be reconstituted based on thereon, and such reconstituted file may then be employed.

In another scenario, it can be the case that data files of an organization or the like are to be replicated at multiple branch locations of the organization, perhaps from a central location such as a hub. For example, an architectural design firm may wish to have all architectural design files thereof available at any one of several branches of such firm.

In such a situation, a networked system can be constructed to replicate a copy of each file to each branch, and to keep all files at all branches current. In such a system, for example, a centralized hub server would store each such file, and a replication service would be employed to distribute a copy of each file at the hub over a network to a branch server or the like at each branch. However, it is to be appreciated that as the number of files of the organization increases, and as the size of each file increases, and as the number of branches increases, the amount of traffic over the network also increases, perhaps to a point that exceeds available bandwidth. Moreover, as the overall size of all the files at the hub server increases, it may in fact become the case that each branch server does not have enough space available thereon to store all of such files as replicated from the hub server.

Similar to the previous scenario, though, it can be the case that some, many, and perhaps even most of the computer files on the branch server of a particular branch are not of interest and can be considered to be superfluous. Such superfluous files may for example relate to matters that are not relevant to the particular branch, likely will not be accessed through the particular branch, and therefore have little if any real value in being replicated on the branch server for the particular branch. For example, a branch office of an architectural design firm in Wilkes-Barre, Pa. likely has very little if any need to have architectural design files relating to a project handled by a branch office of the firm in Boynton Beach, Fla.

In such a situation, then, and similar to previous scenario, it would be useful to be able to wholly store on a branch server of a particular branch only those files relevant to the particular branch, while only partially storing on such branch server of such particular branch all other non-relevant files as available from the hub server for the organization. Thus, in a manner akin to that of the previous scenario, it would be useful to be able to 'ghost' the non-relevant files at the branch server of the particular branch, such that each non-relevant file remains on the branch server in a smaller, 'ghosted' form. Thus, and again, if in fact the ghosted file is needed at the branch server, the data for such ghosted file may be retrieved from the hub server, the ghosted file may be reconstituted based on thereon, and such reconstituted file may then be employed.

Accordingly, a need exists for a method and mechanism by which a file at a source such as a local volume or a branch server may be replicated or ghosted such that the data thereof is stored at a sink such as an alternate location or a hub server, and the file at the source is thus in a reduced or ghosted form that can be reconstituted if need be. In particular, a need exists for such a method and mechanism by which such a ghosted file may be formed and reconstituted, as necessary.

SUMMARY OF THE INVENTION

The aforementioned needs are satisfied at least in part by the present invention in which a method is provided in connection with a computing device having a storage volume, a file system managing the storage volume, and a file stored on the storage volume by the file system and accessed by such file system. The method is performed in response to the file system receiving an open command from an application with respect to the file and the file system upon receiving the open command noting that the file has been ghosted in that data of the file has been moved to an alternate location and returning an error.

In the method, such returned error is intercepted and based thereon it is perceived that the file has been ghosted. Thus, the file system is commanded to retrieve ghosting information from the ghosted file and such ghosting information is received. A handle is then created corresponding to the ghosted file, and the handle is delivered to the application as the response to the open command therefrom. Thereafter, a read command is received from the application with respect to the opened ghosted file, where the read command has parameters including the handle, an offset into the data of the ghosted file, and a read length with respect to such data. Reconstituting of the ghosted file is then initiated based on the data thereof at the alternate location, and after the ghosted file has been reconstituted the read command is responded to with the data requested.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIGS. 3A and 3B are block diagrams showing the file and data of FIG. 2, whereby only the data is stored at the sink (FIG. 3A) and whereby the entire file is stored at the sink (FIG. 3B) in accordance with embodiments of the present invention;

DETAILED DESCRIPTION OF THE INVENTION

Computer Environment

Figure 1:
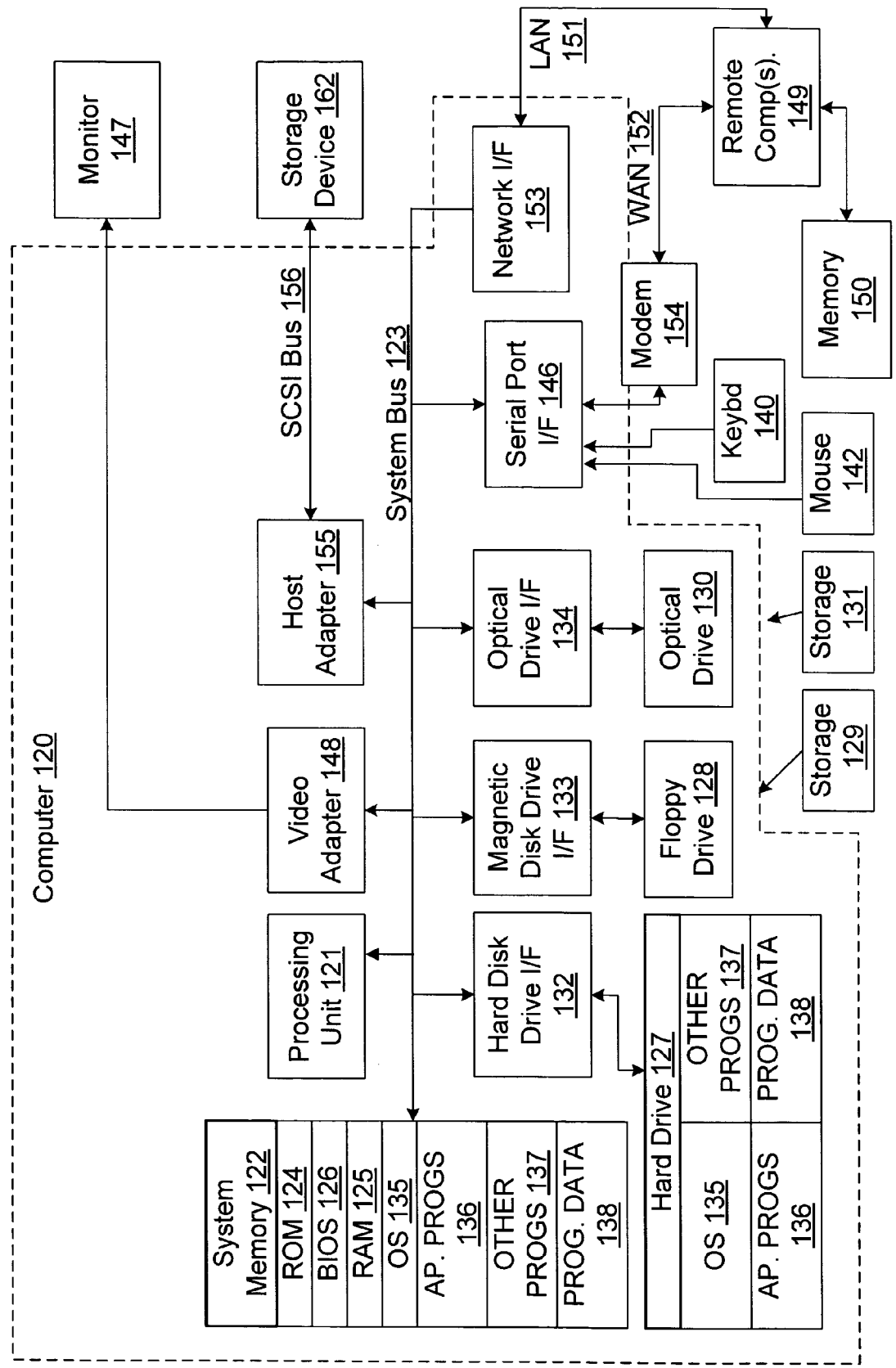
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Ghosting and Reconstituting a File

Figure 2:
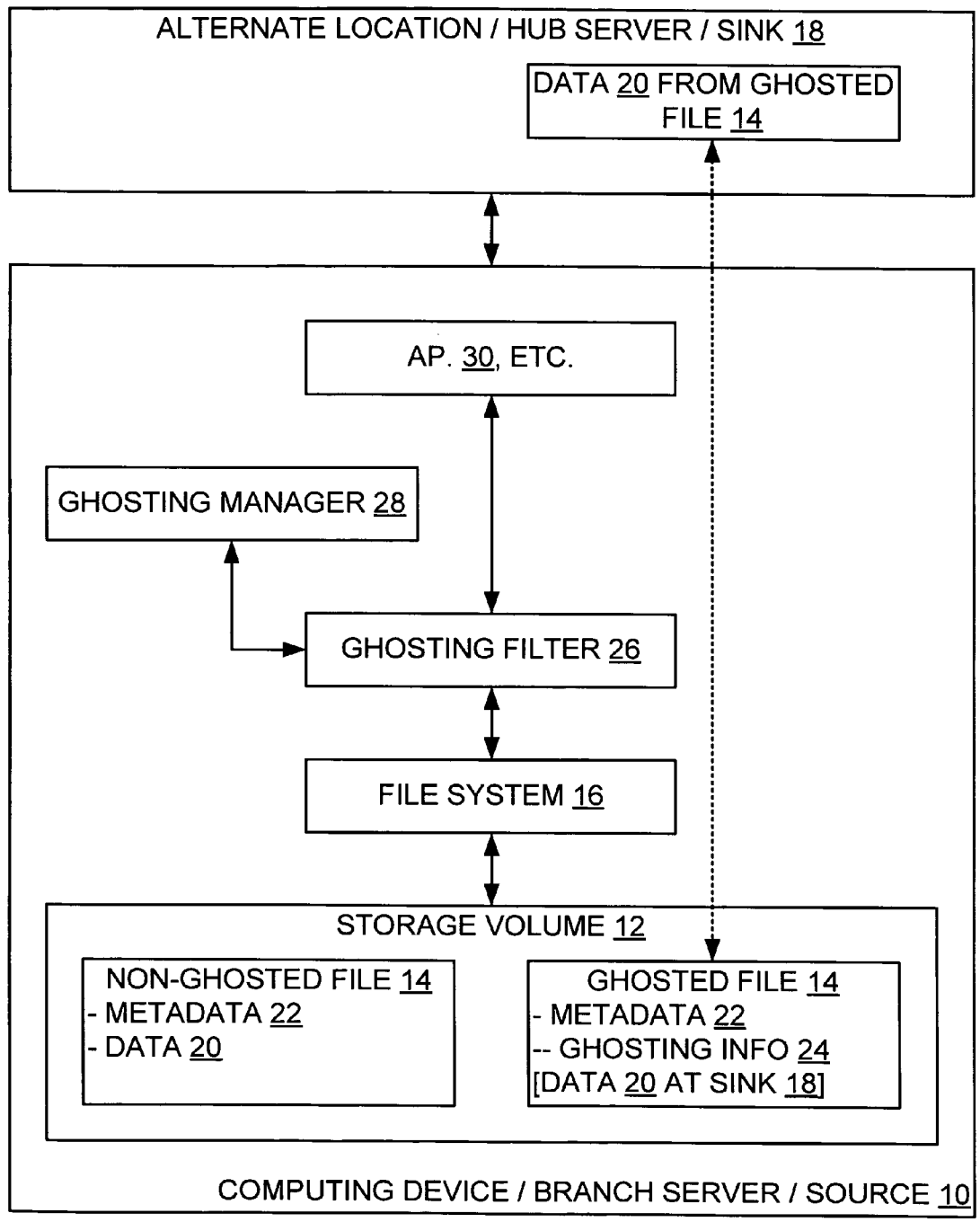
FIG. 2 is a block diagram showing a file ghosted at a source such that the data thereof is stored at a sink in accordance with embodiments of the present invention.

In the present invention, and turning now to FIG. 2, a computing device 10 such as a personal computer or a computer server or the like has a storage volume 12 such as a hard drive or a persistent RAM drive or the like, the volume 12 has stored thereon a number of computer files 14, and the files 14 on the volume 12 are organized by, accessed through, and otherwise controlled by a file system 16 running on the computing device 10. As may be appreciated, the computing device 10, volume 12, files 14, and file system 16 may be any type of computing device, volume, file, and file system without departing from the spirit and scope of the present invention.

In one embodiment of the present invention, the computing device 10 is a personal computer or the like and at least some of the files 14 on the volume 12 thereof have been determined to be cold in that such files 14 for example have not been accessed for some extended length of time and/or likely will not be accessed for some extended length of time, and therefore have little if any real value in remaining on the volume 12. Note, though, that coldness of a file 14 may be defined in any appropriate manner without departing from the spirit and scope of the present invention.

At any rate, upon being determined to be cold, a file 14 is not deleted from the volume 12 but instead is reduced in size on the volume 12 by removing at least some data 20 thereof to an alternate location 18. Such alternate location 18 may be local to the computing device or may be remote therefrom. In general, such alternate location 18 is appropriately coupled to the computing device 10 and may be any appropriate storage location without departing from the spirit and scope of the present invention. For example, the alternate location 18 may be another volume 12 on the storage device 10, another volume 12 on another computing device 10, a file warehouse at a server, a long-term storage device at a remote server, or the like.

With the alternate location 18, then, space on the volume 12 may be freed by moving the aforementioned data 20 from such cold files 14 to such alternate location 18. Significantly, although the data 20 from such a cold file 14 has been moved, such cold file 14 remains as a presence or 'ghost' on the volume 12, albeit in a reduced or 'ghosted' form. Thus, if in fact the ghosted file 14 is needed on the computing device 10, such ghosted file 14 is reconstituted by retrieving the data 20 thereof from the alternate location 18 and re-associating such retrieved data 20 with such ghosted file 14 to form the reconstituted file 14. As may be appreciated, then, once reconstituted, the file 14 may then in fact be employed.

In another embodiment of the present invention, the computing device 10 is a branch server or the like and at least some of the files 14 on the volume 12 thereof have been determined to be irrelevant in that such files 14 for example are not relevant to a branch office associated with such branch server. Of course, irrelevance with respect to a file 14 may be defined in any appropriate manner without departing from the spirit and scope of the present invention.

At any rate, and as before, an irrelevant file 14 is maintained on the volume 12 of the branch server 10 in a reduced format without at least some data 20 thereof. Here such data 20 is stored at an alternate location 18 such as a centralized hub server as maintained by an organization of which the branch office is a branch. Again, such hub server 18 is appropriately coupled to the branch server 10.

With the hub server 18, then, space used on the volume 12 of the branch server 10 may be minimized, and bandwidth necessary to populate such space may also be minimized, by storing such aforementioned data 20 from such irrelevant files 14 at such hub server 18. Significantly, and similar to before, although the data 20 from such an irrelevant file 14 is not present at the branch server 10, such irrelevant file 14 remains as a presence or 'ghost' on the volume 12 of the branch server, albeit in a reduced or 'ghosted' form. Thus, if in fact the ghosted file 14 is needed at the branch server 10, such ghosted file 14 is reconstituted by retrieving the data 20 thereof from the hub server 18 and re-associating such retrieved data 20 with such ghosted file 14 to form the reconstituted file 14. Again, once reconstituted, the file 14 may then in fact be employed.

To generalize then, whether in an arrangement involving a computing device 10 such as a personal computer and an alternate location 18, a branch server 10 and a hub server 18, or otherwise, 'ghosting' involves a file 14 on a volume 12 at a source 10, as seen in FIG. 2, where a determination has been made that the file 14 should only be present on the volume 12 in a reduced format that does not include some portion of the data 20 associated with such file 14. Accordingly, and as seen in FIG. 2, such data 20 is stored at a sink 18 appropriately coupled to the source 10.

With such sink 18, then, space used on the volume 12 of the source 10 may be minimized in that a ghosted file 14 on the volume 12 is present in a reduced or 'stub' form. Thus, if in fact the ghosted file 14 is needed at the source 10, such ghosted file 14 is reconstituted by retrieving the data 20 thereof from the sink 18 and re-associating such retrieved data 20 with such ghosted file 14 to form the reconstituted file 14. Once again, once reconstituted, the file 14 may then in fact be employed at the source 10 as necessary.

In one embodiment of the present invention, the stub of a ghosted file 14 as present on the volume of a source 10 is stored in the same location on the volume 12 as the original file 14. Thus, whether the file system 16 organizes the volume 12 according to a directory format or otherwise, the file system 16 looking in a particular location for a file 14 that has been ghosted should find the stub for the file 14, i.e., the ghosted file 14, at such location. Significantly, the ghosted file 14 as resident on the volume 12 of the source 10 contains all metadata 22 from the original, non-ghosted file 14, and also contains ghosting information 24 that may be employed to retrieve the data 20 for the file 14 from the sink 18, among other things. As may be appreciated, such ghosting information 24 may be added to the metadata 22 for the file 14 or may be stored in another location of the file 14.

Accordingly, a user or the like can browse the entire volume 12 of the source 10 by way of the file system 16 even if some of the files 14 on the volume 12 are ghosted and some of the files 14 on the volume 12 are not ghosted. In particular, the metadata 22 associated with a ghosted file 14 may be employed during such browsing to, among other things, identify the ghosted file 14, provide size information, date information, and the like. When the user tries to access a ghosted file 14, the data 20 thereof is retrieved based on the ghosting information 24 present in the ghosted file 14, the ghosted file 14 is reconstituted into a non-ghosted file 14, and the non-ghosted file 14 may then in fact be accessed by the user.

Figure 3A:
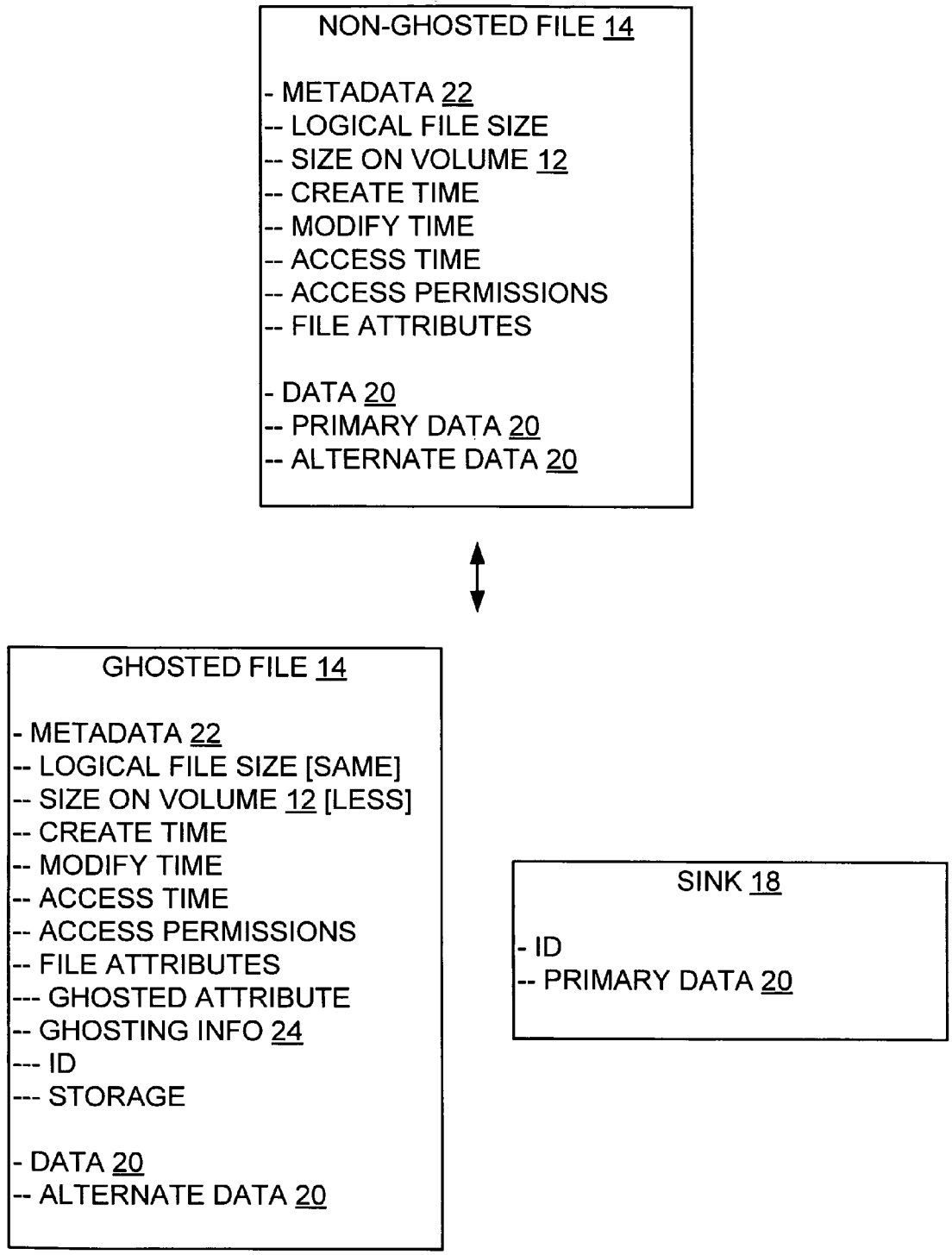

Turning now to FIG. 3A, it is seen that a non-ghosted file 14 as may be resident on a volume 12 at the source 10 includes metadata 22 that may be organized into a header or the like, where such metadata 22 includes information relating to the data 20 of the un-ghosted file 14 such as a logical file size, a size on the volume 12, a create time, a modify time, an access time, access permissions, and various file attributes. In addition, and as should be evident, such non-ghosted file 14 as resident on the volume 12 at the source 10 includes the actual data 20 of the file 14. Note here that such actual data 20 may be organized as primary data and alternate data, where the primary data is the data 20 from the file 14 as may be employed by an application 30 or the like (FIG. 2), while the alternate data is the data from the file 14 that has been created for other uses. As but one example, such alternate data may include a graphic representation such as a 'thumbnail' that can be employed when displaying a representation of the file 14, perhaps by the application 30 or the file system 16 at the source 10.

At any rate, it is likely the case that the primary data is the bulk of the data 20 by size. Accordingly, when the non-ghosted file 14 is in fact ghosted, it may in fact be the case that only the primary data of the data 20 is removed from the remainder of non-ghosted file 14 to form the ghosted file 14, and that only such primary data is stored at the sink 18, perhaps along with an identification of the ghosted file 14, as is shown in FIG. 3A. Of course, other portions of the file 14 may also be removed during ghosting of a file 14 without departing from the spirit and scope of the present invention.

As may be appreciated, though, when the non-ghosted file 14 is in fact ghosted in the context of a branch server 10 and a hub server 18, where the hub server 18 replicates files 14 to the branch server 10, it may in fact be the case that while the primary data of the data 20 is removed from the remainder of the replicated file 14 at the source 18 to form the ghosted file 14, the entirety of such file 14 is stored at the sink 18, perhaps along with an identification of the ghosted file 14, as is shown in FIG. 3B.

Figure 4:
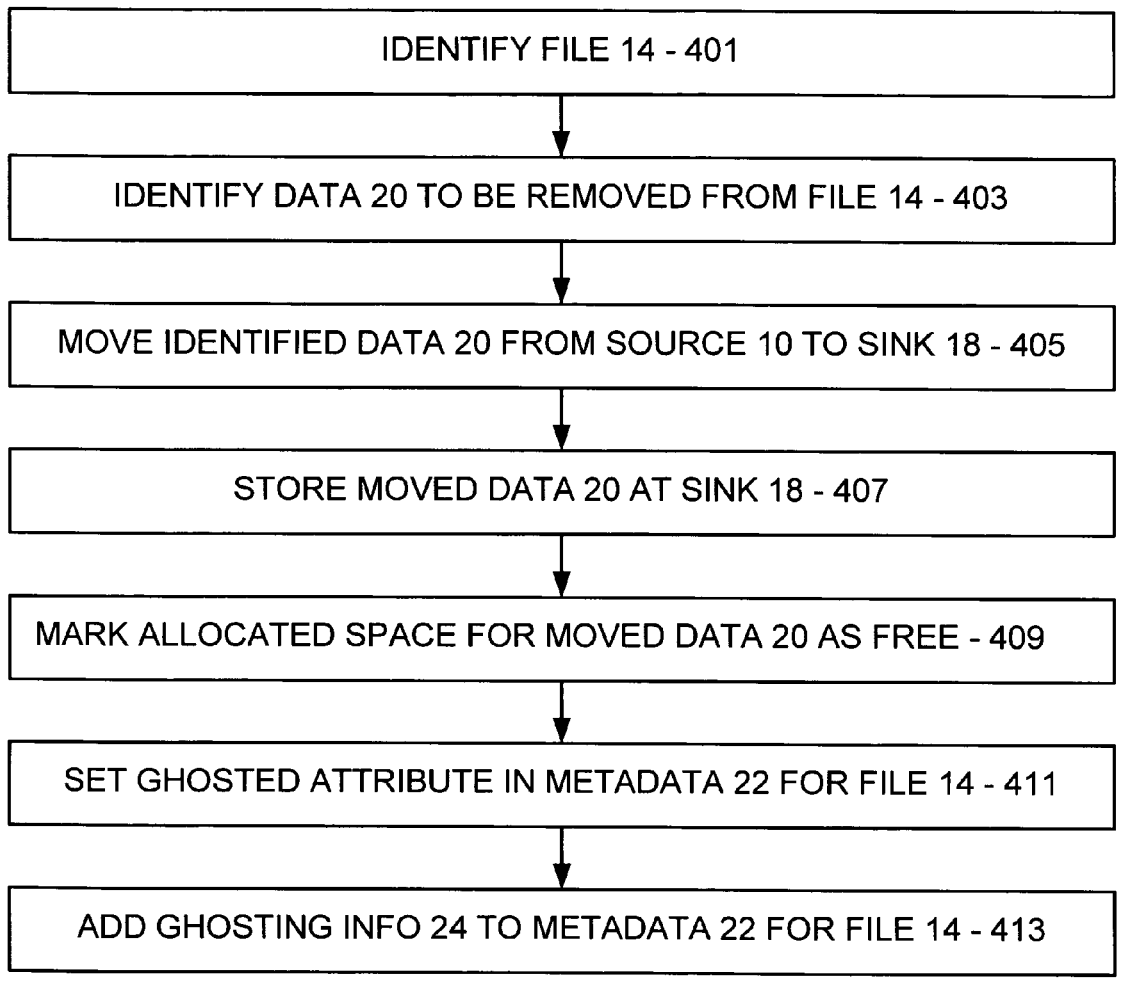
FIG. 4 is a flow diagram showing key steps performed in ghosting a file to the sink of FIG. 2 in accordance with one embodiment of the present invention.

To convert a non-ghosted file 14 to a ghosted file 14 (i.e., to ghost a file 14), and referring now to FIGS. 3 and 4, the file 14 is first identified (step 401), and thereafter the data 20 to be removed from the file 14 is identified (step 403). Again, such data 20 is typically the primary data of the data 20, but could be other data from such data 20. At any rate, the identified data 20 is then moved from the source 10 to the sink 18 by way of an appropriate transport mechanism and conduit (step 405), and such moved data 20 is then stored at the sink 18 in an appropriate format (step 407). As may be appreciated, storing the data 20 at the sink 18 may be done in any appropriate format and manner without departing from the spirit and scope of the present invention. For example, the data 20 may be compressed and/or encrypted if so desired, and such data 20 should be stored in a manner so that such data 20 can be retrieved with relative ease upon a request to reconstitute the file 14. For example, such data 20 may be stored according to an ID employed for retrieval, as will be set forth in more detail below.

Once the data 20 has been moved as at step 405, the space occupied by such data 20 on the volume 12 of the source 10 need not remain allocated to the file 14, as may be appreciated. Accordingly, such allocated space can be marked as free (step 409), with the result being that the now-ghosted file 14 is marked as being sparse. Significantly, although such allocated space has been freed from use by the ghosted file 14, the logical file size of the now-ghosted file 14 should not be changed in the metadata 22 for such file 14 or elsewhere, although the size on volume 12 for the file 14 may in fact be changed to reflect such freed space.

In addition, in one embodiment of the present invention, the metadata 22 for the now-ghosted file 14 is amended to show that such file 14 is now ghosted (step 411). To do so, for example, a 'ghosted' attribute may be set in the metadata 22. As may be appreciated, such set ghosted attribute may be employed primarily as a signal to an inquiring application 30 or the like that the file 14 is in fact ghosted. With such a signal, then, the inquiring application 30 can appreciate not only that the file 14 is in fact ghosted but that accessing such file 14 involves a cost in that such file 14 must first be reconstituted into a non-ghosted form. As should be understood, such cost may be in terms of bandwidth needed to access the data 20 for the file 14 from the sink 18, space required for the data 20 on the volume 12, and/or latency to access the data 20 at the sink 18 and reconstitute the file 14 based thereon, among other things.

Also, in one embodiment of the present invention, the metadata 22 for the now-ghosted file 14 is amended to include the aforementioned ghosting information 24 (step 413). Again, such ghosting information 24 includes information that may be employed to retrieve the data 20 for the file 14 from the sink 18, among other things. For example, such ghosting information 24 may include the ID stored with and identifying the data 20 at the sink 18, as well as an amount of storage that can be employed to store other information relevant to the ghosted file 14, including information on how to locate the sink 18, how to reconstitute the file 14, and/or the like. Such storage in the ghosting information 24 can be a variable or fixed amount, and in the latter case might be limited to 16 kilobytes or so. As may be appreciated, such ghosting information 24 is employed primarily by whatever construct is employed to reconstitute the file 14, and is not typically used by the aforementioned inquiring application 30 or the like, although such use may nevertheless occur without departing from the spirit and scope of the present invention.

As should now be appreciated, a ghosted file 14 as ghosted may reside undisturbed on the volume 12 of the source 10 for a short time, for a long time, for a very long time, or forever, at least until the volume 12 no longer remains in operation. At any point in time, though, and turning now to FIG. 5, it is to be appreciated that a request to access the stored data 20 of the ghosted file 14 may be received from an application 30, a user at such application 30, etc. (step 501). Of course, prior to such a request, it is also possible that one or more requests to access the metadata 22 of such ghosted file 14 may also be received. For example, the aforementioned application 30 may access the set ghosted attribute in the metadata 22 of such ghosted file 14 to determine that the file 14 is in fact ghosted, or the file system 16 that controls the volume 12 may access the metadata 22 in the course of compiling a directory listing or the like. In the latter case, and notably, the file system 16, the application 30, or another entity may also access the alternate data of the data 22 to obtain the aforementioned graphic that can be employed when displaying a representation of the file 14.

At any rate, in response to a request to access the stored data 20 of the ghosted file 14 as at step 501, the ghosted file 14 is in fact reconstituted in the following manner. Preliminarily, the file 14 is located on the volume 12 (step 503), and thereafter the ghosting information 24 in the metadata 22 of the file 14 is identified (step 505). As may be appreciated, the data 20 of the file 14 as stored at the sink 18 is located based on such identified ghosting information 24 (step 507), and such located data 20 can then be moved from the sink 18 to the source 10 by way of an appropriate transport mechanism and conduit (step 511).

Of course, to store such data 20 with the file 14 at the source 10, space to be occupied by such data 20 on the volume 12 of the source 10 must be allocated (step 509), with the result being that the no-longer-ghosted file 14 is no longer marked as being sparse. As may now be appreciated, after the data 20 has in fact been moved to the file 14 to reconstitute same, the metadata 22 for the no-longer-ghosted file 14 is amended to show that such file 14 is not ghosted (step 513), such as for example by resetting the ghosted attribute in such metadata 22. Also, the metadata 22 for the no-longer-ghosted file 14 is amended to remove the ghosting information 24 (step 515). Accordingly, the file 14 is now in a non-ghosted form.

As should now be appreciated, there are two main scenarios which result in creation of a ghosted file 14. In the first scenario, the file 14 is created directly as a ghosted file 14 on the volume 12. Such ghost creation may be typical in a replication architecture such as that set forth above with a branch server 10 and a hub server 18. In such a replication architecture, populating each of several branch servers 10 with non-ghosted copies of all files 14 from a central hub server 18 would require tremendous amounts of bandwidth. Accordingly, and instead, a replication engine may decide to simply create ghosted copies of the files 14 on the branch servers 10. The data 20 associated with any particular ghosted file 14 at any particular branch server 10, then, may be retrieved from the hub server 18 on demand as and when necessary to reconstitute such particular ghosted file 14 into a non-ghosted file 14 at such particular branch server 10.

In the second scenario, the file 14 is created as a non-ghosted file 14 on the volume 12 and is at some later time converted to a ghosted file 14 on such volume 12. Such non-ghost creation may be typical in a space-saving architecture such as that set forth above with a personal computer or the like and an alternate location 18. In such a space-saving architecture, space on a volume 12 of the personal computer or the like is reclaimed by moving data 20 associated with files 14 that are, for example, seldom used, to the alternate location 18, which may be another media or to another system. As with the first scenario, the data 20 associated with any particular ghosted file 14 at the personal computer or the like may be retrieved from the alternate location 18 on demand as and when necessary to reconstitute such particular ghosted file 14 into a non-ghosted file 14.

Figure 5:
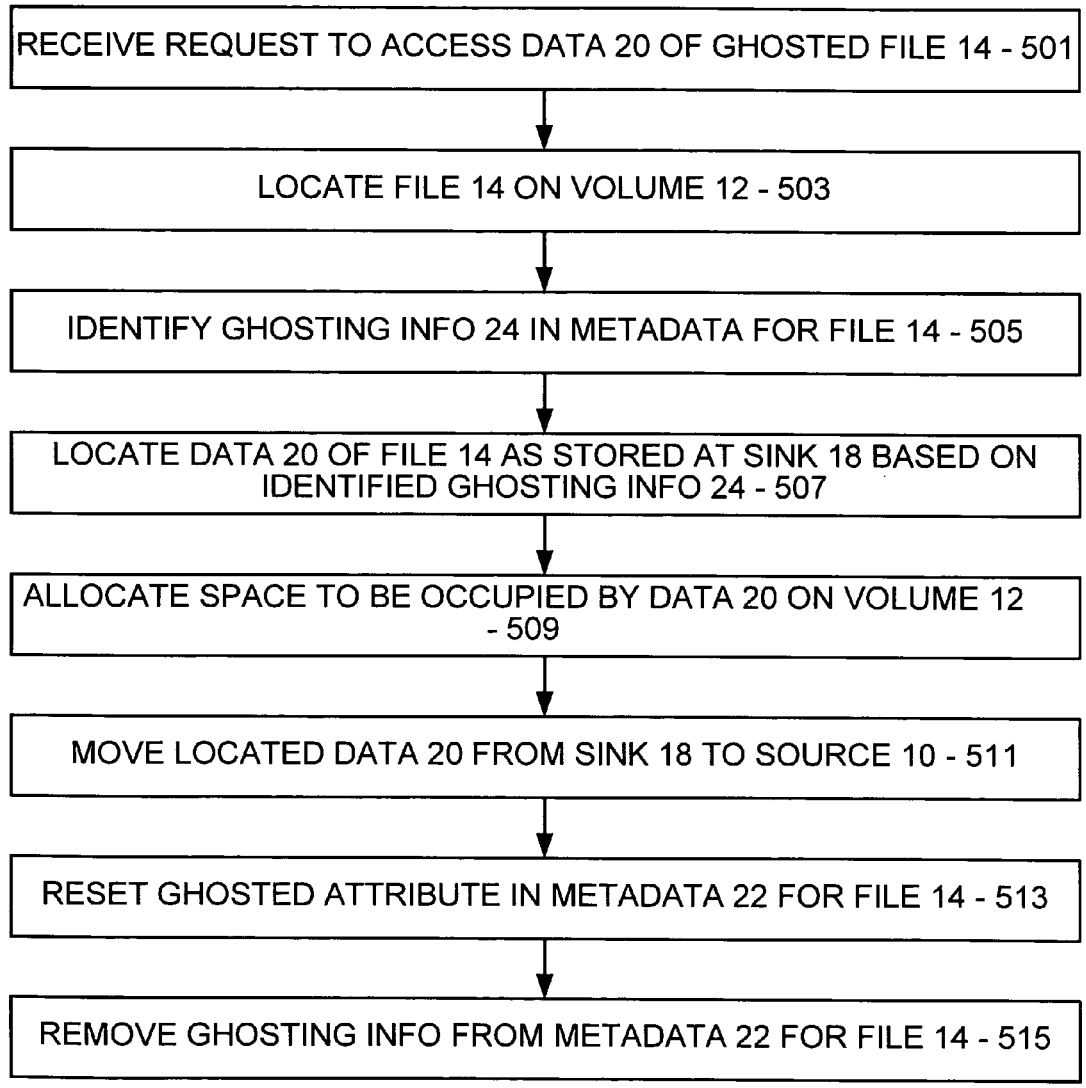
FIG. 5 is a flow diagram showing key steps performed in reconstituting the ghosted file from the sink of FIG. 2 in accordance with one embodiment of the present invention.

In one embodiment of the present invention, the operations of FIG. 5 that are performed at the source 10 on behalf of a user or application 30 and with respect to a ghosted file 14 are in fact performed with the aid of a ghosting filter 26, as may be seen in FIG. 2. Such operations may be performed transparently or with notice to the user or application 30, although transparency is likely preferable to such user or application 30. In particular, when a user or application 30 tries to access the removed data 20 of a ghosted file 14, the file system 16 upon receiving a request for such access will discover that the ghosted file 14 does not contain the removed data 20 and thus return an error which the ghosting filter 26 will intercept. Upon such interception, then, the ghosting filter 26 employs the file system 16 to obtain the ghosting information 24 from the metadata 22 for the ghosted file 14, and based on the obtained ghosting information 24 such ghosting filter 26 triggers reconstituting of such ghosted file 14, as will be set forth in more detail below, so that the request for access may ultimately be honored.

As may be appreciated, the ghosting filter 26 may be a lower-level construct without much functionality and without access to network resources such as the sink 18. In such a situation, and as shown in FIG. 2, the ghosting filter 26 may interface with a higher-level construct such as a ghosting manager 28, where such ghosting manager 28 includes additional ghosting functionality and direct access to network resources such as the sink 18. Moreover, in such a situation, it is to be appreciated that when the ghosting filter 26 triggers such reconstituting of such ghosted file 14, the ghosting manager 28 performs the bulk of such reconstituting functionality for the source 10 as is shown in connection with FIG. 5, as will be set forth in more detail below. Such ghosting manager 28 may also perform the bulk of the ghosting functionality for the source 10 as is shown in connection with FIG. 4.

Application 30 Requesting Data 20 from Ghosted File 14

Although reconstituting a ghosted file 14 has already been detailed above in connection with FIG. 4, it is instructive to revisit such process from the point of view of an application 30 or the like wishing to read some portion of the data 20 of such ghosted file 14. As may be appreciated, then, such an application 30 wishing to read such data 20 from such file 14 typically achieves such a function by issuing an open command to the file system 16 with regard to the file 14, and then issuing a read command to the file system 16 with regard to such opened file 14. In one embodiment of the present invention, such application 30 continues to issue such open and read commands, although such commands are interpreted somewhat differently based on the file 14 at issue being ghosted. Such differences are transparent to and of little concern to the application 30, although the application 30 may experience some latency in the course of the ghosted file 14 being reconstituted, where such latency likely is due in large part to moving the data 20 from the sink 18 to the source 10.

Figure 6:
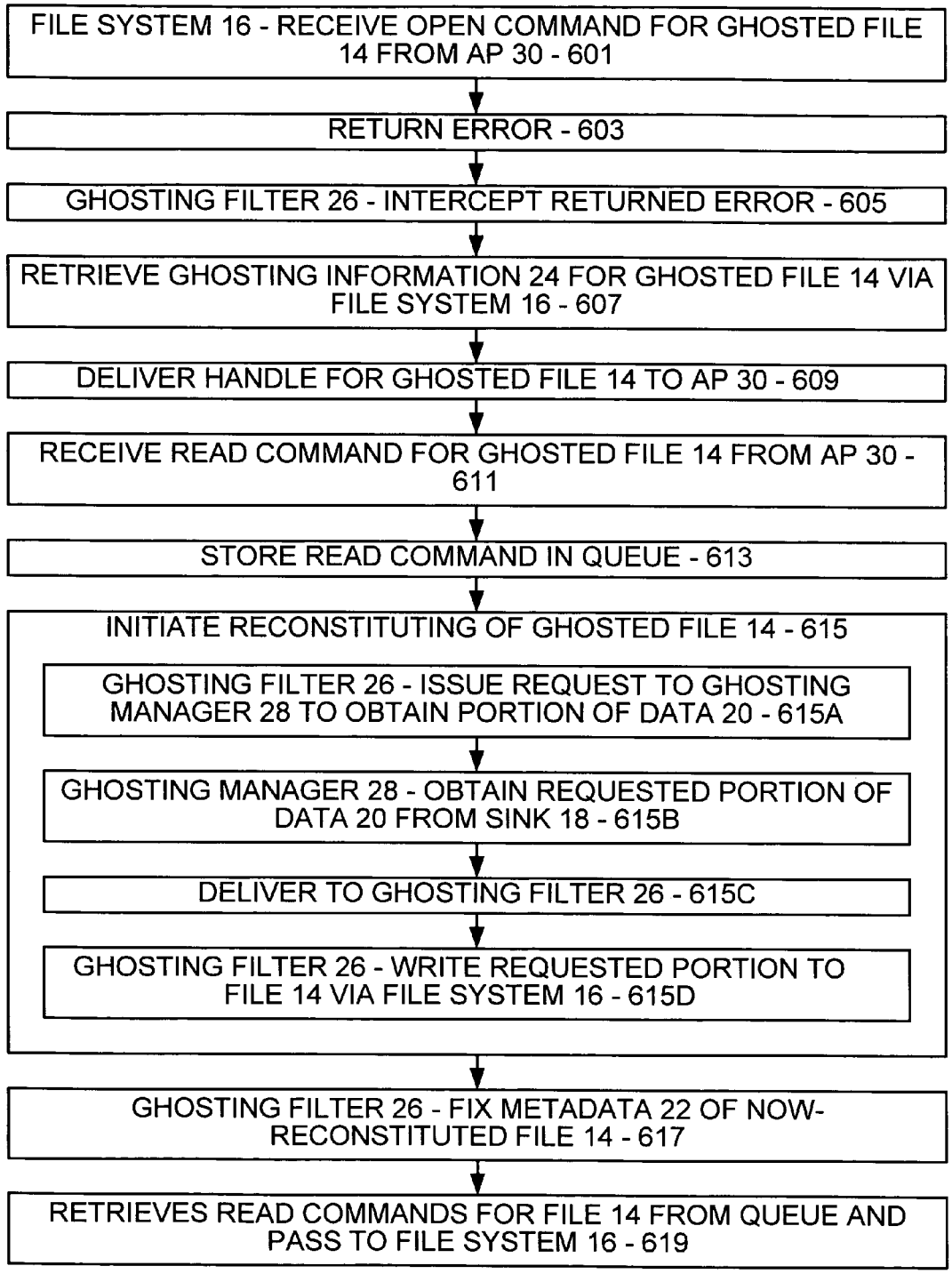
FIG. 6 is a flow diagram showing in more detail key steps performed in reconstituting the ghosted file from the sink of FIG. 2 in accordance with one embodiment of the present invention.

At any rate, and turning now to FIG. 6, the application 30 begins the process by issuing the open command with respect to a particular ghosted file 14 on the volume 12, and such open command ultimately is received by the file system 16 (step 601). Notably, the application 30 in issuing such open command is not expected to have any knowledge that the particular file 14 is in fact ghosted, although the application 30 could in fact make such a determination by commanding the file system 16 to report whether the ghosted attribute is set for the file 14.

As was noted above, the file system 16 upon receiving the open command notes that the ghosted file 14 does not contain the removed data 20 and thus returns an error (step 603), and the ghosting filter 26 intercepts such returned error and perceives based thereon that the file 14 at issue is in fact in a ghosted format (step 605). Accordingly, the ghosting filter 26 itself commands the file system 16 to retrieve the ghosting information 24 from such ghosted file 14 and in fact receives such ghosting information 24 (step 607). Based on such ghosting information 24, then, the ghosting filter 26 creates a buffer and a handle corresponding to the ghosted file 14, and delivers the handle to the application 30 as the (normal) response to the open command therefrom (step 609).

Note that the handle for the ghosted file 14 as received by the application 30 represents an instance of the ghosted file 14 as opened, and is employed by the application 30 as the reference to such file 14 when issuing further commands with respect to such file 14, such as for example a read command or a close command. However, and significantly, such handle for the ghosted file 14 as created by the ghosting filter 26 and as employed as a handle parameter of a command from the application 30 will cause such command to be delivered directly to the ghosting filter 26 and not to the file system 16.

Note too that the buffer for the ghosted file 14 is employed by the ghosting filter 26 to store information relating to the ghosted file 14, such as for example the ghosting information 24 thereof. Thus, in the course of the ghosted file 14 being manipulated by the ghosting filter 26, changes to such ghosting information 24 can be recorded in the buffer and need not be written back to the file 14. Of course, after the ghosting filter 26 has finished manipulating the ghosted file 14, such recorded changes in the buffer can be written back to the ghosting information 24 for the file 14 if need be.

At any rate, with the handle for the ghosted file 14 from the ghosting filter 26, the application 30 may proceed by issuing the read command with respect to the particular ghosted file 14 on the volume 12, where such read command has parameters including the handle, an offset into the data 20 for the file, a read length with respect to such data 20 starting from such offset, and the like. Accordingly, such read command based on having such handle as a parameter thereof ultimately is received by the ghosting filter 26 and not the file system 16 (step 611). However, and as should be evident, the data 20 is not in fact present in the ghosted file 14, and accordingly the ghosting filter stores the read command in a queue or the like for awaiting further processing (step 613).

Such further processing, as should be understood, primarily comprises obtaining the data 20 for the ghosted file 14 from the sink 18. In particular, the ghosting filter 26 initiates reconstituting of the ghosted file 14 based on the data 20 thereof at the sink 18 (step 615), where such reconstituting may occur in the following manner.

Remembering that the ghosting filter 26 may interface with the ghosting manager 28 to perform higher-level ghosting functionality and direct access to network resources such as the sink 18, the ghosting filter 26 issues to the ghosting manager 28 a request to obtain some portion of the data 20 for the ghosted file 14 from the sink 18 (step 615a), where such request includes the ID from the ghosting information 24 of the ghosted file 14, an offset into the data 20, and a length of data 20 to be obtained starting from such offset. Thereafter, the ghosting manager 28 in fact obtains the requested portion of such data 20 from the sink 18 (step 615b). Presumably, the ghosting manager 28 includes all necessary functionality to so obtain, and does so in a manner that is known or should be apparent to the relevant public and which need not be set forth herein in any detail. Accordingly, any particular method of so obtaining may be employed without departing from the spirit and scope of the present invention.

Note that it may be the case that in the course of the ghosting manager 28 obtaining the requested portion of data 20 from the sink 18 as at step 615b, there may be some delay. For example, it may be the case that such data 20 is obtained over a network, in which case there may be a network delay, perhaps on the order of a few milliseconds, a few seconds, or even more. Thus, the ghosting manager 28, the ghosting filter 26, and/or another entity may wish to maintain a pending data list representing each portion of data 20 that has been requested from the sink 18 and not yet obtained therefrom, perhaps along with a corresponding request time. As may be appreciated, an identification of each requested portion of data is added to the pending data list upon being so requested, and is removed from such pending data list upon being received and stored with the ghosted file 14. With such pending data list, then, it may be the case that all pending requests for data 20 are monitored for age, and that requests that are not satisfied within a certain period of time may be timed out.

Once the ghosting manager 28 has in fact obtained such requested portion of such data 20 from the sink 18, such ghosting manager 28 delivers such requested portion to the ghosting filter 26 (step 615c), and such ghosting filter 26 then writes such requested portion to an appropriate location of the file 14 at issue by way of appropriate command to the file system 16 (step 615d). Writing such requested portion to the appropriate location of the file 14 at issue is known or should be apparent to the relevant public and therefore need not be set forth herein in any detail. Accordingly, any particular method of so writing may be employed without departing from the spirit and scope of the present invention.

Of course, it may be necessary to repeat steps 615a-615d a number of times until all of the data 20 for the file 14 is written thereto, and such steps are therefore repeated as necessary. Once all of the data 20 for the file 14 is in fact written thereto, the ghosting filter 26 issues commands as necessary to the file system 14 to fix the metadata 22 of such now-reconstituted file 14, including removing the ghosting information 24 and resetting the ghosted attribute (step 617). In addition, the ghosting filter 26 retrieves all read commands for the file 14 from the queue and passes such read commands to the file system 16 for further processing (step 619), whereby the read command from the application 30 is in fact responded to with the data 20 at issue.

Note that the handle for the opened file 14 remains associated with the ghosting filter 26 and continues to direct commands from the application 30 in connection with such now-reconstituted file 14 to such ghosting filter 26. Accordingly, it may be the case that the ghosting filter 26 forwards such commands to the file system 16, it may be the case that the ghosting filtering 26 re-associates the handle with the file system 16, or it may be the case that the ghosting filter commands another construct to re-associate the handle with the file system 16, or the like.

Partial Reconstitution of Ghosted File 14

As may be appreciated, it should not be necessary to completely reconstitute a ghosted file 14 in circumstances where less than all of the ghosted data 20 from the file 14 is required by a requesting application 30. Thus, if an application 30 can determine that only 1, 2, 12, or 100 kilobytes at a particular offset of 2 gigabytes of data 20 are needed, it should not be necessary to obtain the 2 gigabytes of data 20 from the sink 18, but instead only the kilobytes of needed data 20 at the particular offset. Moreover, in such a situation, by only partially reconstituting a ghosted file 14, the need to transmit a considerable amount of unneeded data 20 from the sink 18 to the source 10 is avoided and bandwidth required to do so is correspondingly reduced.

By only partially reconstituting a ghosted file 14, then, an application 30 is able to read only a few bytes of a file if need be without triggering a complete reconstitution of the file 14. Thus, and for example, if only the first frame of a video file 14 is needed, such first frame would be obtained from the data 20 for the file 14 at the sink 18, and not the entire amount of data 20 for the ghosted file 14, which could be on the order of 10 or even 100 gigabytes. Partially reconstituting, then, fetches only as much of the data 20 at the sink 18 for a ghosted file 14 as is necessary, to satisfy a particular read request from an application 30, and no more.

Note that when partially reconstituting a ghosted file 14, it may or may not be the case that the portion of data 20 obtained from the sink 18 is actually removed from such sink 18. On the one hand, such portion as obtained is stored at the source 10 and therefore need no longer be maintained at the sink 18. However, on the other hand, it may actually require more effort to in fact delete the obtained portion from the sink 18. Moreover, in at least some circumstances such obtained portion should remain at the sink 18 for access by other sources 10, such as for example if the sink is a hub server 18 and the source is a branch server 10.

As may be appreciated, if a ghosted file 14 is in fact partially reconstituted, a record must be maintained to note what portions of the ghosted file 14 are in fact reconstituted so that the ghosting filter 26 can determine whether such portions are present in the ghosted file 14. Accordingly, and in one embodiment of the present invention, such a record is maintained in the ghosting information 24 in the metadata 22 of such ghosted file 14. In particular, for each contiguous section of data 20 of a ghosted file 14 that is reconstituted and thus is present at the ghosted file 14, the ghosting information 24 includes therefor a section reference including an offset describing the beginning of the section and a length describing a contiguous amount of such section.

Typically, the ghosting information 24 for a ghosted file 14 including the aforementioned records of partially reconstituted data 20 is maintained by the ghosting filter 26. As was noted above, although such ghosting filter 26 could maintain and update such ghosting information 24 directly in the metadata 22 of the ghosted file 14 by way of the file system 16, such maintaining and updating can interfere with other operations performed by the file system 16. Thus, the ghosting filter 26 in the course of manipulating the ghosted file 14 instead initially obtains such ghosting information 24 from such metadata 22 and stores such ghosting information 24 in a buffer created in connection with the ghosted file 14 as at step 609 of FIG. 6, then maintains and updates such ghosting information 24 during the course of manipulating the ghosted file 14, and upon concluding writes such ghosting information 24 from the buffer to the metadata 22 for the ghosted file 14.

Note that on occasion the partial reconstituting of a ghosted file 14 may be interrupted, for example by a loss of power or network connectivity at the source 12. Likewise, it may also be the case that the buffer for the ghosted file 14 is lost, especially in the case of a loss of power and where the buffer is maintained in a volatile RAM or the like. In such a situation, the ghosting information 24 as maintained and updated is lost and not written from the buffer to the metadata 22 for the file 14, and in effect not only is such ghosting information 24 lost, but all partially reconstituted data 20 associated therewith is also lost even though physically present at the source 10, especially inasmuch as such data 20 cannot be located without such ghosting information 24. Accordingly, in one embodiment of the present invention, such ghosting information 24 as maintained and updated is periodically written from the buffer to the metadata 22 for the file 14, such as for example once every minute or so. Thus, at most, only a minute or so of such ghosting information 24 and the partially reconstituted data 20 associated therewith can be lost due to a loss of the buffer.

In one embodiment of the present invention, a ghosted file 14 is only partially reconstituted based on an appropriate command from the application 30 requesting data 20 from such ghosted file 14. Accordingly, such application 30 must first check with the file system 16 to determine whether the ghosted attribute is set for a particular file 14 to determine whether such file 14 is in fact ghosted, and if so the application 30 may then by appropriate command request a partial reconstitution of a portion or portions of the data 20 for such ghosted file 14.

In view of partial reconstitution, then, and in one embodiment of the present invention, the ghosting filter 26 in response to a read command with regard to ghosted file 14 such as that given at step 611 of FIG. 6 responds thereto by first reviewing any section references in the ghosting information 24 for such ghosted file 14 as stored in a corresponding buffer, and then determines from the section references whether the requested data 20 or a portion thereof is already present in the ghosted file 14 at the source 10. If all of the requested data 20 is in fact present, such data 20 is read from the ghosted file 14 at the source 10 without need for obtaining such data 20 from the sink 18. If only a portion of the requested data 20 is present, such present portion of the data 20 is read from the ghosted file 14 at the source 10 without need for obtaining such data 20 from the sink 18 and the remainder of the data 20 is obtained from the sink 18 and then read as above. If none of the requested data 20 is present, all of such data 20 is obtained from the sink 18 and then read as above.

Figure 7:
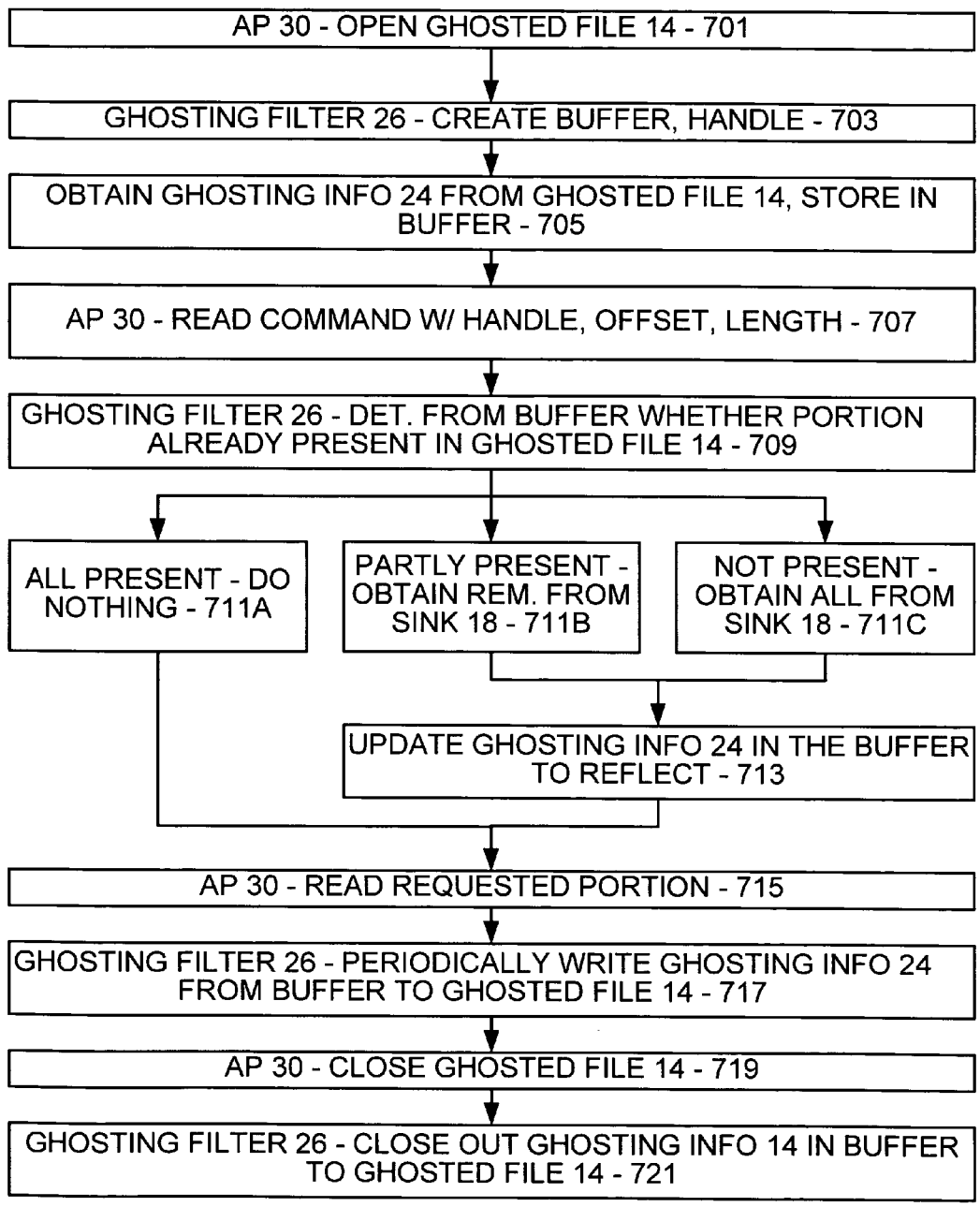
FIG. 7 is a flow diagram showing key steps performed in partially reconstituting the ghosted file from the sink of FIG. 2 in accordance with one embodiment of the present invention.

To summarize, then, and turning now to FIG. 7, in response to a command from an application 30 to open a ghosted file 14 from which partial reconstituting may be required (step 701), the ghosting filter 26 again creates a buffer and a handle corresponding to the ghosted file 14, and delivers the handle to the application 30 as the (normal) response to the open command therefrom as at step 609 (step 703). In addition, the ghosting filter 26 initially obtains the ghosting information 24 from the metadata 22 for the ghosted file 14 and stores such ghosting information 24 in the created buffer (step 705).

As before, with the handle for the ghosted file 14 from the ghosting filter 26, the application 30 issues a read command for a portion of the data 20 of the particular ghosted file 14 on the volume 12, where such read command includes the handle, and defines the offset and length of the portion as at step 611 (step 707). Here, in response to the read command, the ghosting filter 26 determines based on the ghosting information 24 in the buffer for the ghosted file 14 whether such portion as defined is at least partially already present in the ghosted file 14 as resident at the source 10 (step 709). Making such a determination is known or should be apparent to the relevant public and therefore need not be set forth herein in any detail. Accordingly, and method of making such determination may be employed without departing from the spirit and scope of the present invention.

Again, if all of the portion of the data 20 is in fact present, such portion such data need not be obtained from the sink 18 (step 711*a*). If only a part of the portion of the data 20 is present, the remainder of the portion of the data 20 is obtained from the sink 18 (step 711*b*). If none of the portion of the data 20 is present, all of such portion of the data 20 is obtained from the sink 18 (step 711*c*). Significantly, upon obtaining any part of the data 20 from the sink 18 as at steps 711*b* or 711*c*, the ghosting filter 26 updates the ghosting information 24 for the ghosted file 14 as stored in the buffer to appropriately reflect that the part of the data 20 is now resident with and reconstituted to the ghosted file 14 (step 713). At any rate, with the requested portion of the data 20 now resident at the source 10, such requested portion now may in fact be read by the application 30 as at step 619 (step 715).

As was set forth above, the ghosting filter 26 periodically writes the ghosting information 24 in its most current form from the buffer to the metadata 22 for the file 14 so that such ghosting information 24 and the partially reconstituted data 20 associated therewith is not wholly lost in the event of a loss of the buffer (step 717). In addition, once the ghosted file 14 is closed, such as for example at the command of the application 30 (step 719), the ghosting filter 26 closes out the buffer by writing the ghosting information 24 in its most current form from such buffer to the metadata 22 for the file 14 (step 721), presuming of course that the ghosted file 14 has not been fully reconstituted. Thus, such ghosting information 24 in its most current form may again be retrieved at some later time as at step 705.

Fast Reading of Partially Reconstituted Ghosted File 14

Figure 8:
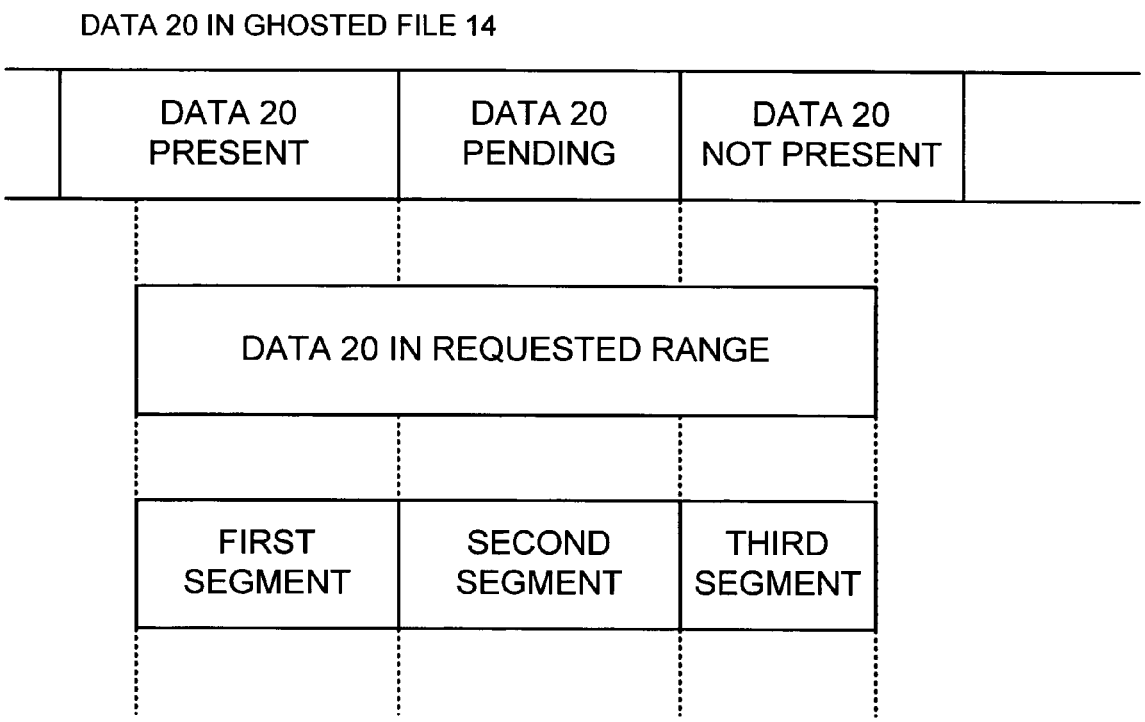
FIG. 8 is a block diagram showing various statuses for the data of the file of FIG. 2 in accordance with one embodiments of the present invention.

An application 30 in issuing a read command with respect to a ghosted file 14 does not take into consideration the state of the ghosted file 14, and in particular does not take into consideration whether the ghosted file 14 has already been partially reconstituted and/or is already in the process of being partially reconstituted. That is, and turning now to FIG. 8, it may be the case that a particular read command with respect to a ghosted file 14 specifies a particular portion of the data 20, and that such particular portion corresponds to a first segment comprising data 20 that is already present in the ghosted file 14, a second segment comprising data 20 that is pending to be copied from the sink 18 to the ghosted file 14, and a third segment comprising data 20 that is not present in the ghosted file 14 but is instead stored at the sink 18 only.

As may be appreciated, if such a read command were to be processed such that all of the particular portion of the data 20 were copied from the sink 18 to the ghosted file 14, such processing would be duplicative and wasteful with regard to at least the first and second segments corresponding to such particular portion. In particular, and as may also be appreciated, copying the data 20 corresponding to the first segment is unnecessary inasmuch as such data 20 is already present in the ghosted file 14, and copying the data 20 corresponding to the second segment is unnecessary inasmuch as such data 20 is already pending to be copied from the sink 18 to the ghosted file 14. In point of fact, only the data 20 corresponding to the third segment need be copied from the sink 18 to the ghosted file 14 inasmuch as such data 20 is not present in the ghosted file 14 and has not already been requested to be copied to such ghosted file 14.

In one embodiment of the present invention, then, the ghosting filter 26 processes such a read command for a particular portion of data 20 by first identifying with regard to such particular portion of data 20 corresponding segments in the ghosted file 14 that are already present (i.e., first segments), corresponding segments in the ghosted file 14 that are already pending (i.e., second segments), and corresponding segments in the ghosted file 14 that are not present or pending (i.e., third segments), and then in fact obtaining only such third segments. In effect, then, the ghosting filter 26 strips out from the read command all segments that need not in fact be read from the sink 18. By performing such a stripping action, the read command is handled faster in that such 'fast read' obtains only that data 20 from the sink that in fact is needed and not data 20 that is already present in the ghosted file 14 or that is pending. Thus, the fast read as performed by the ghosting filter 26 results in a faster response to the read command from the application 30, and concomitantly reduces the amount of bandwidth necessary for such read command.

In one embodiment of the present invention, the ghosting filter 26 identifies each first segment in the ghosted file 14 that is already present with reference to the ghosting information 24 maintained for such ghosted file 14. As was set forth above, such ghosting information 24 may be referred to as located in the metadata 22 for such ghosted file 14, or may be referred to as located in a buffer corresponding to such ghosted file 14. Likewise, in one embodiment of the present invention, the ghosting filter 26 identifies each second segment in the ghosted file 14 that is already pending with reference to information in the pending data list disclosed above in connection with step 615*b* of FIG. 6. Identifying such first and second segments with reference to such ghosting information 24 and pending data list should be known or apparent to the relevant public and therefore need not be set forth herein in any detail. Accordingly, such identification may be performed in any appropriate manner without departing from the spirit and scope of the present invention.

As may now be appreciated, once the first and second segments are identified, the remainder is the third segment(s), and by process of elimination, then, such third segments of the ghosted file 14 that are not present or pending are identified. Of course, once identified, such third segments may in fact be requested from the sink 18 and upon receipt copied to the ghosted file 14. Note that once requested, each such third segment in effect becomes a second, pending segment. Note, too, that once received and copied to the ghosted file 14, each second segment in effect becomes a first, present segment. Note, finally, that once a segment becomes a first segment, such first segment is available to in fact be read by the application 30 in response to the read command therefrom.

In at least some circumstances, it may be appreciated that although an application 30 has not issued a read command for particular data 20 in a ghosted file 14, the ghost filter 26 nevertheless should move such data 20 from the sink 18 to the ghosted file 14 in anticipation of such a read command, especially if the ghosting filter 14 is not otherwise occupied. As but one example, when streaming content such as a ghosted audio file 14, a ghosted video file 14, or a ghosted multimedia file 14, it is reasonable to anticipate that a read command for data 20 at a particular time period T0 will be followed by a read command for data 20 at a following time period T1. In such a situation, the ghosting filter 26 if not otherwise occupied can avail itself of the opportunity to obtain such data 20 for the time period T1 from the sink 18 even without a specific read command from the application 30. Of course, in doing so, the ghosting filter 26 may perform such action as a fast read in the manner set forth above.

Figure 9:
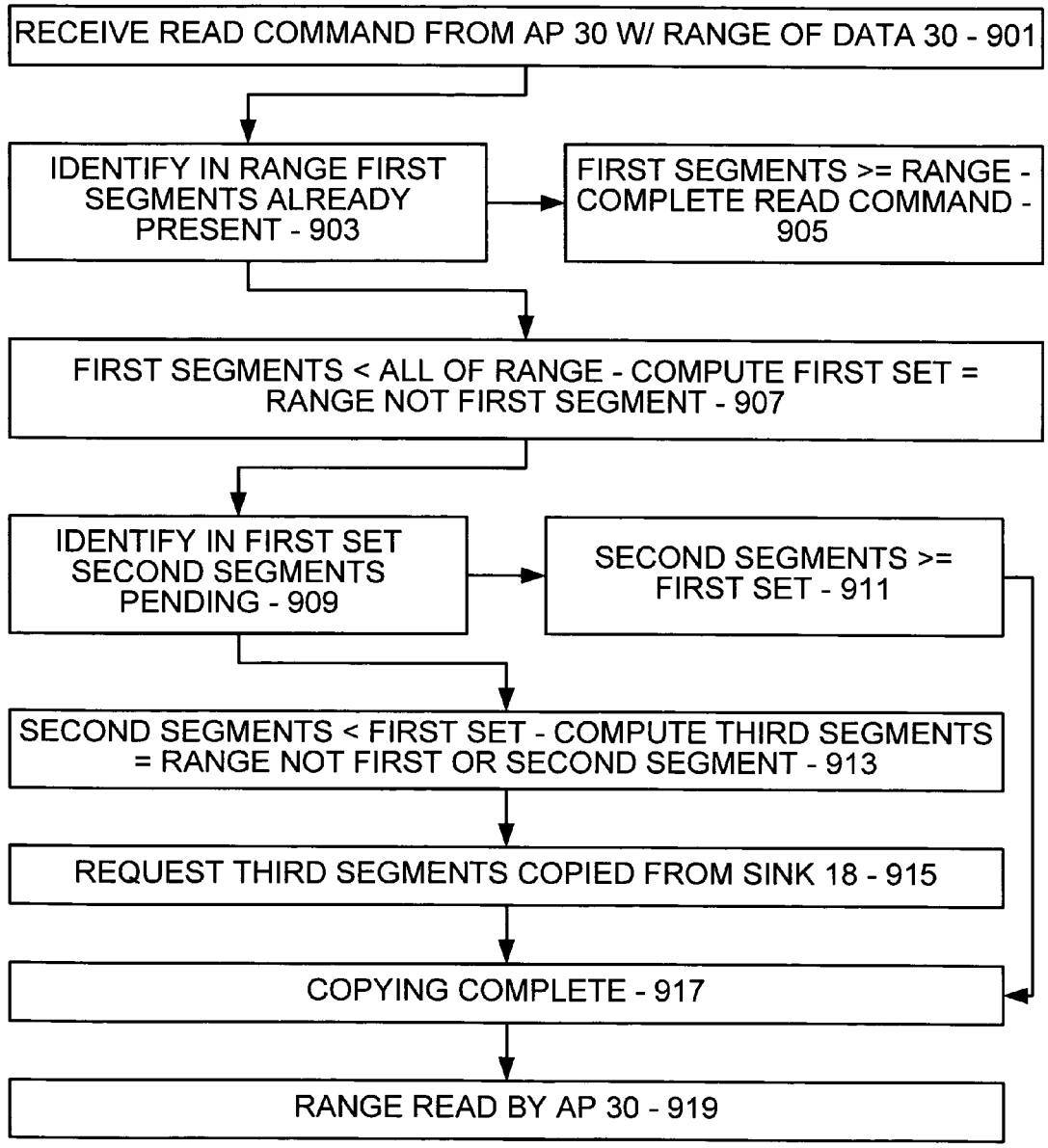
FIG. 9 is a flow diagram showing key steps performed in efficiently reconstituting at least a portion of the ghosted file from the sink of FIG. 2 based on the status of the segments of the data of the portion as set forth in FIG. 8 in accordance with one embodiment of the present invention.

To summarize, then, and turning now to FIG. 9, the ghosting filter 26 performs a fast read in response to a read command from an application 30 in the following manner. Preliminarily, the read command is indeed received from the application 30, where such read command specifying a portion or range of the data 30 to be read from a ghosted file 14 (step 901). Typically, and again, such range is expressed as an offset and a length with respect to the data 30.

Thereafter, the ghosting filter 26 first identifies within such range of data 20 corresponding first segments of data 20 in the ghosted file 14 that are already present (step 903). Again, such identification is performed with reference to the ghosting information 24 maintained for such ghosted file 14, either in the metadata 22 for such ghosted file 14 or in a buffer corresponding to such ghosted file 14. If the identified first segments comprise all of the requested range of data 20, the ghosted file 14 has already been reconstituted to the extent necessary to satisfy the read command, and such read command may thus be completed without any further copying of data 20 from the sink 18 and without waiting for any pending data 20 (step 905).

However, if the identified first segments do not comprise all of the requested range of data 20, the ghosted file 14 must indeed be reconstituted to the extent necessary to satisfy the read command, at least based on pending data 20, and accordingly, the ghosting filter 26 computes a first set comprising the range of each segment of the requested range of data 20 that is not a first segment (step 907). Thereafter, and similar to before, the ghosting filter 26 identifies within the first set corresponding second segments of data 20 in the ghosted file 14 that are pending (step 909). Again, such identification is performed with reference to the pending data list. If the identified second segments comprise all of the first set, the ghosted file 14 is pending to be reconstituted to the extent necessary to satisfy the read command, and such read command may be completed when all pending data 20 is in fact copied to the ghosted file 14 (step 911).

As should now be appreciated, though, if the identified second segments do not comprise all of the first set, the ghosted file 14 must indeed be reconstituted to the extent necessary to satisfy the read command, based on data 20 to be copied from the sink 18, and accordingly, the ghosting filter 26 computes a second set comprising the range of each segment of the requested range of data 20 that is not a first segment and not a second segment (step 913), i.e., the third segments. Thereafter, the ghosting filter 26 requests the second set/third segments be copied from the sink 18 to the ghosted file 14 (step 915).

In the course of time, and again, each third segment as requested become a second, pending segment, and each second segment as in fact copied becomes a first, present segment, until all copying is complete (step 917). Thereafter, the requested range of the read command is available to in fact be read by the application 30 in response to such read command (step 919).

Re-Ghosting/Ghosting A File 14

As may be appreciated, a ghosted file 14 that has been reconstituted or partially reconstituted can at some point be re-ghosted, for example if additional space is required at the source 10. In addition, and as may also be appreciated, a file 14 that has never been ghosted likewise can at some point be ghosted for similar reasons.

In particular, once a ghosted file 14 has been partially or fully reconstituted or once a file 14 is installed at the source 10, such file 14 continues to reside at the source 10 in such form unless such file 14 is re-ghosted or ghosted (hereinafter, 're-ghosted'). Such re-ghosting is triggered by some event, which may for example be a determination of a need for space at the source 10, a determination that the file 14 has not been accessed for some period of time, etc. Moreover, by re-ghosting a file 14, especially in the context of a branch server 10 and a hub server 18, any changes to the file 14 at the source 10 or the sink 18 may be replicated to the sink 18 or the source 10, respectively, to keep the file 14 up-to-date.

In one embodiment of the present invention, then, re-ghosting at the source 10 is performed according to a re-ghosting algorithm which takes into account factors such as last access time, remaining free space on the volume, frequency of access to the data, modifications to the file 14 that take place elsewhere, and/or the like. The re-ghosting algorithm in considering such factors should have as a goal reducing the likelihood of a ghosted file 14 being reconstituted again shortly after being re-ghosted. Thus, bandwidth necessary for such ghosting and re-ghosting may be minimized if not reduced. Typically, although not necessarily, the re-ghosting algorithm is performed by an application 30 at the source 10 or by the ghosting manager 28 at the source 10, although other entities may perform such re-ghosting algorithm without departing from the spirit and scope of the present invention.

The re-ghosting algorithm as employed to re-ghost files 14 at a source 10 may be defined at least partially based on configurable policy. In particular, such re-ghosting algorithm may be triggered at least partially based on configurable policy, and such re-ghosting algorithm may decide to re-ghost a particular file 14 at least partially based on configurable policy. In each instance, such policy may be configurable by a user of the source 10, by an administrator of the source 10, or the like.

Possible triggering parameters employed in connection with a re-ghosting algorithm include but are not limited to:

a periodic trigger that is activated when a predetermined period of time has elapsed;

a space trigger that is activated when free space at the volume 12 at the source 10 falls below a certain amount or when used space at the volume 12 at the source 10 exceeds a certain amount;

a periodic-space trigger that is activated when a predetermined period of time has elapsed, but only if free space at the source 10 falls below a certain amount or used space at the source exceeds a certain amount;

a full-volume trigger that is activated when the ghosting filter 26 notes a full-volume error returned by the file system 16 to signify that the volume 12 has no remaining free space;

a bytes-downloaded trigger that is activated when a predetermined number of bytes is downloaded to the source 10; and a manual trigger that may be activated by a user, an administrator, or the like.

Of course, triggering the re-ghosting algorithm may occur based on a single one of such triggers or a combination of such triggers.

Possible selection factors for determining whether to re-ghost a particular file 14 include but are not limited to:

- the last time the file 14 was accessed, whereby a file 14 with an older access time may be preferentially re-ghosted;
- the download time associated with the file 14, whereby a file 14 with an older download time may be preferentially re-ghosted;
- the file size for the file 14, whereby a larger file 14 may be preferentially re-ghosted;
- the file type for the file 14, whereby a file 14 with a particular extension may be preferentially re-ghosted
- the file attributes for the file 14, whereby, for example, a file 14 that is a system file is not re-ghosted, but a file 14 that is hidden is re-ghosted;
- whether multiple similar files 14 are present, whereby files 14 that are deemed similar may be preferentially re-ghosted;
- whether the file 14 has been modified at the sink 18, whereby such a file 14 is re-ghosted to remove data 20 therein that may be deemed out-of-date;
- whether the file 14 has been modified at or created at the source 10, whereby such a file 14 may either be not selected to be re-ghosted so as to preserve such modifications/creation or may be selected to be re-ghosted to copy such modifications/creation to the sink 18;
- frequency of access to the file 14 over a particular time period;
- number of accesses to the file 14 over a particular time period;
- frequency of access/number of accesses/last access time of other related files 14, such as for example in the same folder, in the same content set, etc.;
- external input of specific files or types of files to be preferentially re-ghosted, such as for example by way of a list, a method, an XML file, etc.

Of course, the re-ghosting algorithm may employ a single selection factor or a combination of such selection factors.

Note that files 14 selected for re-ghosting may in fact be re-ghosted, or may instead merely be designated as candidates for preferential re-ghosting. In the latter case in particular, re-ghosting may be performed only until a particular stop trigger has been reached. As may be appreciated, such a stop trigger may correspond to the triggering parameter that initiated a re-ghosting session, may correspond to criteria for selecting candidate files 14 for re-ghosting, or may be another trigger without departing from the spirit and scope of the present invention.

Note, too, that in the case where re-ghosting is performed only until some stop trigger is reached, it may be advisable depending on the selection criteria for files 14 that are candidates to be re-ghosted to smooth out re-ghosting across such files 14. For example, if candidate files 14 are selected based on having a last access date of at least two weeks at the source 10, it may be advisable to first re-ghost all of such candidates with a last access date greater than two months, then if necessary to re-ghost all of such candidates with a last access date greater than one months, then if necessary three weeks, etc. until the stop trigger is activated. Likewise, if candidate files 14 are selected based on having a minimum file size of 10 megabytes, it may be advisable to first re-ghost all of such candidates with a file size greater than 1 gigabyte, then if necessary to re-ghost all of such candidates with a file size greater than 100 megabytes, then if necessary 50 megabytes, etc. until the stop trigger is activated. As may be appreciated, in either scenario, some processing is required to create a list of the candidate files 14, to sort the list, to generate one or more rounds of re-ghosting, and the like.

Note, also, that re-ghosting may be employed to maintain consistency of files 14 at the source 10 and at the sink 18, especially in the situation where different versions of the file 14 may be located in both places. Thus, if the file 14 is reconstituted at the source 10 and the data 20 thereof is modified but the corresponding data 20 at the sink 18 is not modified, re-ghosting may be performed to replace the data 20 at the sink 18 with the data at the source 10. Likewise, if the data 20 of the file 14 at the source 10 is not modified but the corresponding data 20 at the sink 18 is modified, re-ghosting may be performed only to delete such data 20 at the source 10, with the expectation that a later reconstitution of such file will copy the data 20 at the sink 18 to the source 10. Of course, if the data 20 of the file 14 at the source 10 is modified and the corresponding data 20 at the sink 18 is also modified, a conflict exists, and accordingly appropriate conflict rules may have to be consulted to determine whether and if so how to re-ghost the file 14.

Figure 10:
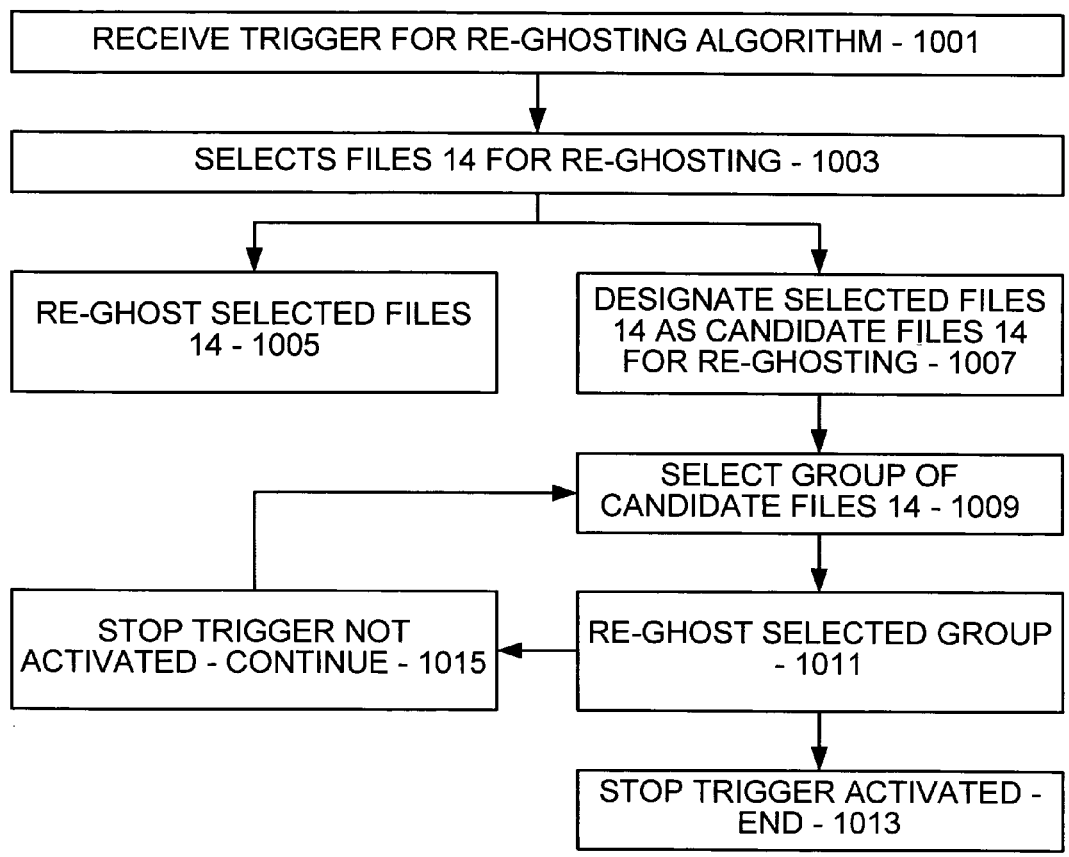
FIG. 10 is a flow diagram showing key steps performed when re-ghosting files to the sink of FIG. 2 in accordance with one embodiment of the present invention.

To summarize, then, and turning now to FIG. 10, re-ghosting of files 14 on a volume 12 may be performed according to a re-ghosting algorithm, where such re-ghosting algorithm is performed by some entity in the following manner. Preliminarily, the re-ghosting algorithm is triggered by some event (step 1001), where such trigger may be internally generated by the entity or externally received by such entity. Upon such triggering, then, the re-ghosting algorithm selects files 14 from among the fully and partially reconstituted files 14 and the never-ghosted files 14 based on some selection criteria (step 1003).

At this point, the re-ghosting algorithm may merely commence by re-ghosting the selected files 14 (step 1005), or may instead consider the selected files 14 to be candidate files 14 for possible re-ghosting (step 1007). In the latter case, the candidate files 14 are then selected for re-ghosting in one or more rounds until a stop trigger is activated. In particular, for each round, a group of the candidate files 14 is selected (step 1009), such selected group is re-ghosted (step 1011), and a determination is made of whether the stop trigger has been activated. If so, the process ends (step 1013). If not, the process continues by returning to select another group as at step 1009 (step 1015).

Generic Ghosting

Figure 11:
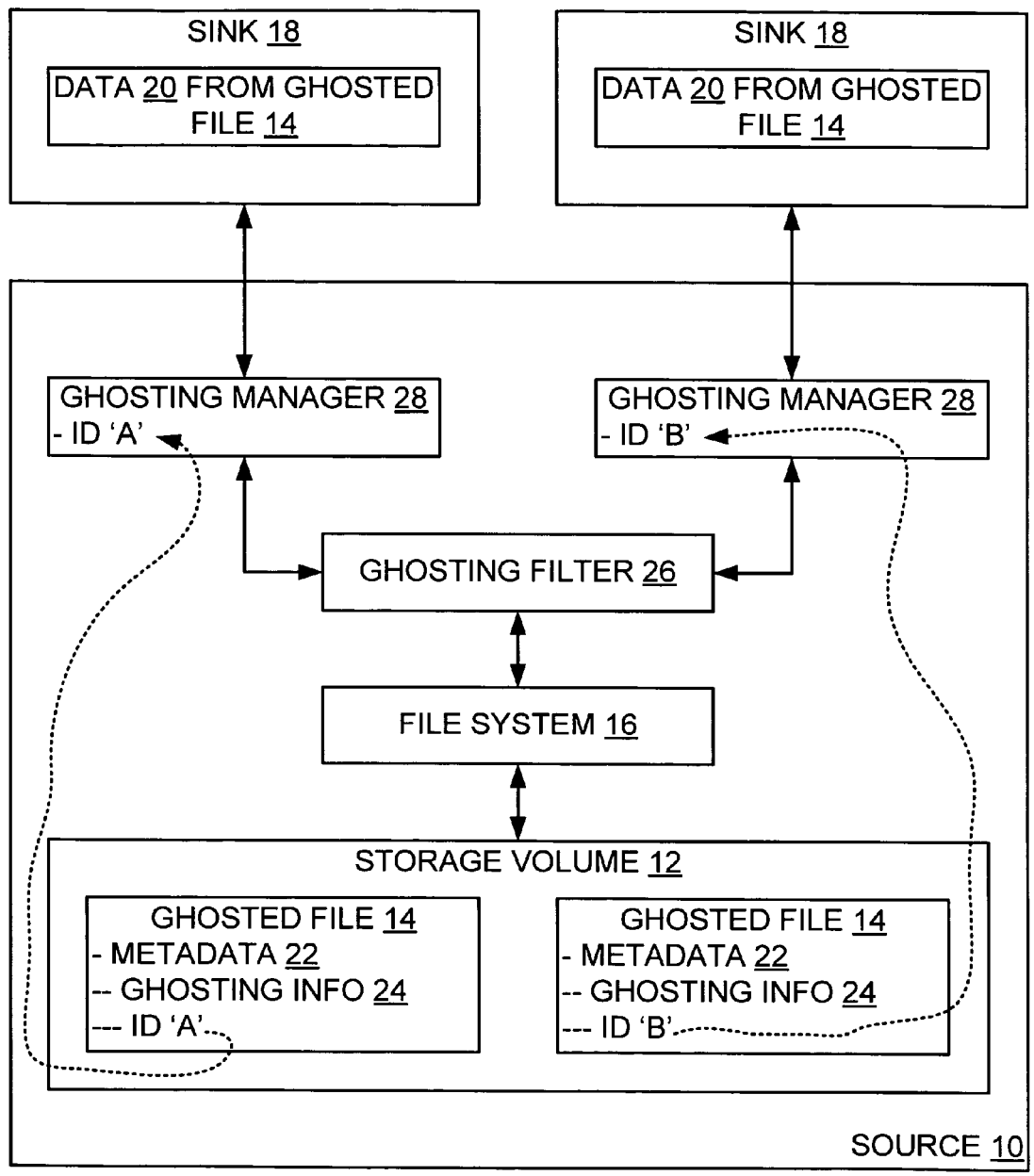
FIG. 11 is a block diagram showing the source of FIG. 2 associated with a plurality of sinks, whereby the source has a single generic ghosting filter and a ghosting manager corresponding to each sink, in accordance with one embodiment of the present invention.

As thus far set forth herein, all files 14 that are ghosted at a particular source 10 are in particular ghosted such that the data 20 thereof resides at a single sink 18. However, and as may be appreciated, it could be the case that that the data 20 of each ghosted file 14 at a particular source 10 may reside at any of a plurality of such sinks 18, as is shown in FIG. 11.

In particular, and as may be appreciated, the ghosting filter 26 of the present invention need not necessarily be restricted to working with a single ghosting manager 28 to ghost data 20 from a file 14 to a single sink 18. Instead, the ghost filter can in fact work with a plurality of ghosting managers 28, wherein each such ghosting manager 28 performs ghosting functions with regard to a particular one of a plurality of sinks 18.

In the context of a branch server 10 and a hub server 18, for example, a particular branch server 10 can interface with multiple hub servers 18. Thus, it may be that one hub server 18 interfaced with the particular branch server 10 has data 20 from a first source while another hub server 18 interfaced with such particular branch server 10 has data 20 from a second source. Likewise, in the context of a computing device 10 and an alternate location 18, for example, a particular computing device 10 can store data 20 at multiple alternate locations. Thus, it may be that one alternate location 18 for a particular computing device 10 is designated as storing data 20 from files 14 of a first particular type, while another alternate location 18 for the particular computing device 10 is designated as storing data 20 from files 14 of a second particular type. Of course, the number of sinks 18 employed and the criteria for dividing data 20 as between such sinks 18 may be any appropriate number and criteria without departing from the spirit and scope of the present invention.

At any rate, if multiple sinks 18 are to be employed with a particular source 18, a mechanism is required to identify which sink 18 has data 20 from a particular ghosted file 14 of such source 10, and to identify which corresponding ghosting manager 28 must be employed to access such sink 18. Accordingly, and in one embodiment of the present invention, such an identification is maintained in the ghosting information 24 associated with such particular file 14, as is shown in FIG. 11.

As a result, the ghosting filter 26 upon encountering any particular ghosted file 14 and reading the ghosting information 24 therefrom can obtain from such ghosting information 24 the identification of the ghosting manager 28 to be employed in connection with such particular ghosted file 14, and based thereon can communicate with such identified ghosting manager 28 to access such sink 18 as appropriate. In effect, then, the ghosting filter 26 is generic to all of the ghosting managers 28, and the identified ghosting manager 28 controls or 'owns' such particular ghosted file 14 inasmuch as the ghosting filter 26 should not ever communicate with any other ghosting manager 28 in connection with such particular ghosted file 14.

Presumably, each ghosting manager 28 includes all functionality and information necessary to communicate with the sink 18 corresponding thereto, such that the ghosting filter 26 need not be concerned with such matters. To the ghosting filter 26, then, communicating with the identified ghosting manager 28 in connection with a particular ghosted file 14 is all that is required to access the corresponding sink 18, and such ghosting filter 26 need not in fact be concerned with how such identified ghosting manager 28 communicates with such corresponding sink 18, how such identified ghosting manager 28 locates such corresponding sink 18, or the like.

Figure 12:
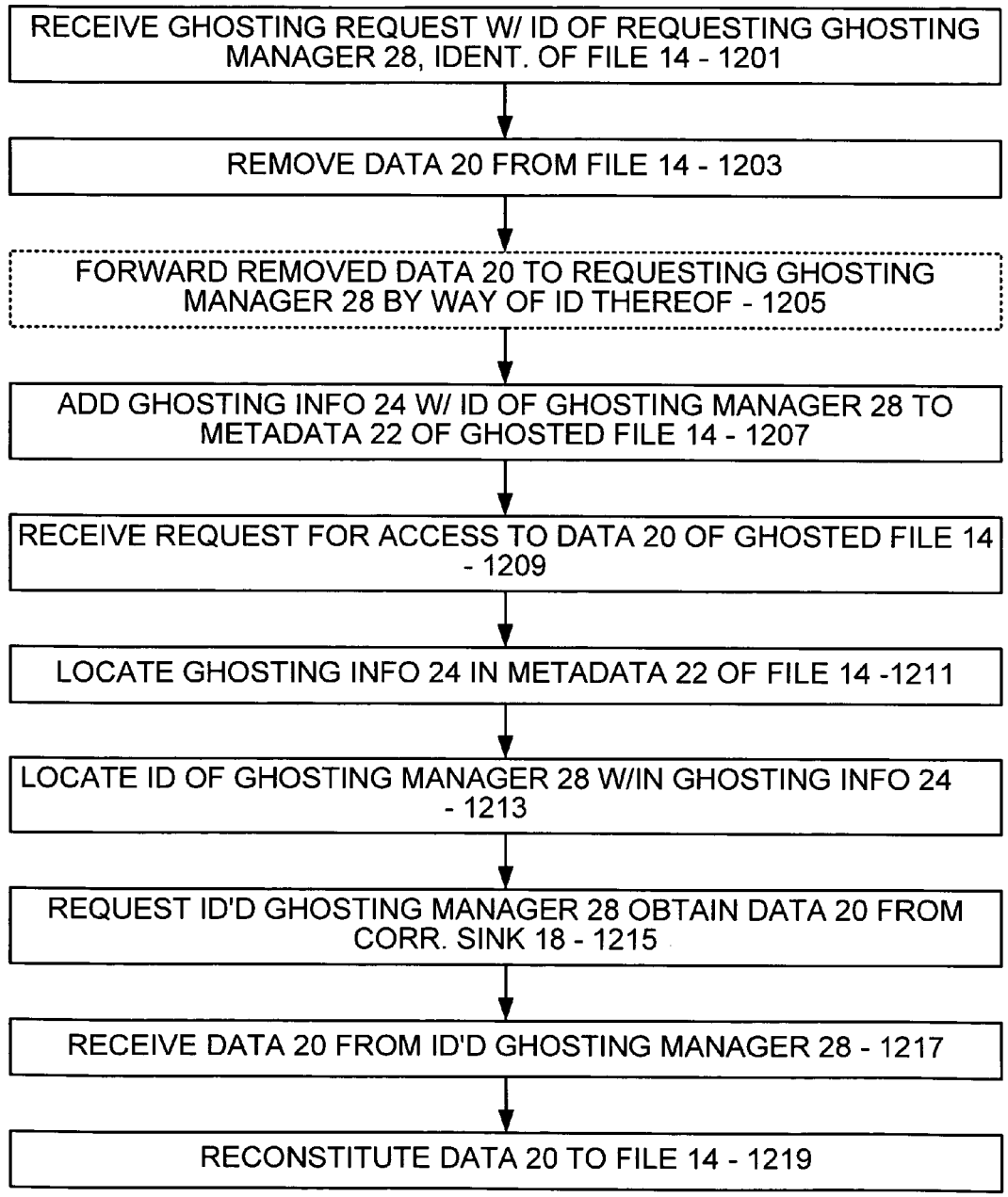
FIG. 12 is a flow diagram showing key steps performed by the ghosting filter of FIG. 11 in ghosting and reconstituting a file at the source in accordance with one embodiment of the present invention.

Similar to the processes shown in FIGS. 4 and 5, then, and now with reference to FIG. 12, generic ghosting and reconstituting of a file 14 is performed in the following manner. Presumably, such ghosting is initiated by a particular ghosting manager 28 having a particular identification (ID) and is in fact performed by the ghosting filter 26, and such ghosting manager 28 thus sends an appropriate ghosting request to the ghosting filter 26 with the ID and an identification of the file 14 to be ghosted (step 1201), and thereafter the ghosting filter 26 removes the data 20 from the file 14 as necessary (step 1203). The ghosting filter 26 then forwards such removed data 20 as necessary to the requesting ghosting manager 28 by way of the ID thereof (step 1205), and such ghosting manager 28 may then forward such removed data to the corresponding sink 18 based on whatever protocols for doing so have been included with such ghosting manager 28.

Note in this regard that depending on the type of sink 18 and file 14, the ghosting manager 28 may in fact choose to not send such removed data to the sink 18, such as for example if the sink 18 replicated the file 14 at issue to the source 10 in a read-only manner. Of course, in such a case it may be that the ghosting request from the ghosting manager 28 informed the ghosting filter to in fact not perform step 1205 as being unnecessary.

At any rate, and as before, the ghosting filter 26 amends the metadata 22 for the now-ghosted file by setting the 'ghosted' attribute and adding the ghosting information 24 (step 1207). Significantly, such ghosting information should include the ID of the ghosting manager 28 for later use when reconstituting the ghosted file 14. Thus, at some later time when the ghosting manager 28 or an application 30 requests access to the data 20 of such ghosted file 14, the request ultimately arrives at the ghosting filter 26 as was set forth above (step 1209) and such ghosting filter 26 locates the ghosting information 24 in the metadata 22 of the file 14 (step 1211).

Again, the data 20 of the file 14 as stored at the sink 18 is located based on such identified ghosting information 24, although in this instance the ghosting filter 26 first locates within such ghosting information 24 the ID of the ghosting manager 28 responsible for such ghosted file 14 (step 1213), and with such ID communicates to the corresponding ghosting manager 28 a request to in fact obtain such data 20 from the corresponding sink 18 (step 1215). Presumably, such ghosting manager 28 does in fact obtain such data 20 from such sink 18 and supplies same to the ghosting filter 26 (step 1217), and such ghosting filter then reconstitutes such data 20 to the file 14 at issue (step 1219).

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which a file 14 at a source 10 such as a local volume 12, a computing device 10, or a branch server 10 may be replicated or ghosted such that the data 20 thereof is stored at a sink 18 such as an alternate location 18 or a hub server 18, and the file 14 at the source is thus in a reduced or ghosted form that can be reconstituted if need be. The ghosted file 14 may be formed and reconstituted, as necessary.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A method for opening and reading a file stored in a computing device, the computing device having a storage volume managed by a file system, the method comprising:
   receiving in the file system of the computing device, a file open command originated through an application;
   generating an error upon recognizing that the file pertaining to the file open command is a ghosted file that does not contain file-related data;
   intercepting in a ghosting filter of the computing device, such error and retrieving in response thereto, ghosting information for the ghosted file;

creating a handle from the ghosting information and delivering the handle to the application for use by the application in issuing further commands with reference to the file;

receiving thereafter, in the file system of the computing device, a file read command;

retrieving the file-related data from an alternate location wherein the file-related data has been stored;

reconstituting the file using the ghosting information and the file-related data obtained from the alternate location; and responding to the file read command by providing the reconstituted file to the file system of the computing device.

2. The method of claim 1 further comprising the ghosting filter creating a buffer for storing information relating to the ghosted file, including the ghosting information thereof.

3. The method of claim 1 wherein retrieving the file-related data comprises:

the ghosting filter issuing to a ghosting manager on the computing device a request to obtain the file-related data from the alternate location, whereby the ghosting manager obtains the requested file-related data from the alternate location and delivers the file-related data to the ghosting filter.

4. The method of claim 3 comprising the ghosting filter issuing to the ghosting manager a plurality of requests for obtaining the file-related data from the alternate location in a plurality of data segments.

5. The method of claim 3, wherein the request includes an ID obtained from the ghosting information, an offset into the file-related data at the alternate location, and a length of data to be obtained starting from such offset.

6. The method of claim 3 comprising the ghosting filter as a lower-level construct without access to the alternate location and the ghosting manager as a higher-level construct with access to the alternate location.

7. The method of claim 1 wherein the ghosted file contains metadata comprising an attribute to indicate that the ghosted file is in fact ghosted.

8. The method of claim 1 further comprising re-associating the handle with the file system after reconstituting the file.

9. The method of claim 1 further comprising the ghosting filter storing the file read command in a queue of file read commands.

10. The method of claim 1 farther comprising issuing a command to the file system to remove the ghosting information from the metadata of the reconstituted file.

11. The method of claim 1 wherein the file includes primary data and secondary data, the primary data being larger than the secondary data, and wherein the secondary data constitutes the file-related data stored in the alternate location.

12. A method for opening a file stored in a computing device, followed by a further file-related command, the computing device having a storage volume managed by a file system, the method comprising:

receiving in the file system of the computing device, a file open command originated through an application;

generating an error upon recognizing that the file pertaining to the file open command is a ghosted file that does not contain file-related data;

intercepting in a ghosting filter of the computing device, such error and retrieving in response thereto, ghosting information for the ghosted file;

creating a handle from the ghosting information and delivering the handle to the application for use by the application in issuing further commands with reference to the file;

receiving thereafter, in the file system of the computing device, the further file-related command;

retrieving the file-related data from an alternate location wherein the file-related data has been stored;

reconstituting the file using the ghosting information and the file-related data obtained from the alternate location; and responding to the further file-related command by implementing the command upon the reconstituted file in the file system of the computing device.

13. The method of claim 12 farther comprising the ghosting filter creating a buffer for storing information relating to the ghosted file, including the ghosting information thereof.

14. The method of claim 12 wherein retrieving the file-related data comprises:

the ghosting filter issuing to a ghosting manager on the computing device, a request to obtain the file-related data from the alternate location, whereby the requested file-related data is obtained by the ghosting manager from the alternate location and delivered to the ghosting filter.

15. The method of claim 14 comprising the ghosting filter issuing a plurality of requests to the ghosting manager, each request for obtaining the file-related data from the alternate location in a plurality of data segments.

16. The method of claim 14, wherein the request includes an ID obtained from the ghosting information, an offset into the file-related data at the alternate location, and a length of data to be obtained starting from such offset.

17. The method of claim 12 wherein the ghosted file includes an attribute to indicate that the ghosted file is in fact ghosted.

18. The method of claim 12 farther comprising storing the further file-related command in a queue of additional file-related commands.

19. The method of claim 12 further comprising after the ghosted file has been reconstituted issuing a command to the file system to remove the ghosting information from the metadata of the reconstituted file.

20. The method of claim 12, wherein the further file-related command is a file close command for closing the reconstituted file in the file system of the computing device.

* * * * *

UNITED STATES PATENT AND TRADEMARK OFFICE
CERTIFICATE OF CORRECTION

| | | |
|---|---|---|
| PATENT NO. | : 7,505,986 B2 | |
| APPLICATION NO. | : 11/181536 | |
| DATED | : March 17, 2009 | |
| INVENTOR(S) | : Sarosh Cyrus Havewala et al. | |

It is certified that error appears in the above-identified patent and that said Letters Patent is hereby corrected as shown below:

In column 23, line 46, in Claim 10, delete "farther" and insert -- further --, therefor.

In column 24, line 23, in Claim 13, delete "farther" and insert -- further --, therefor.

In column 24, line 46, in Claim 18, delete "farther" and insert -- further --, therefor.

Signed and Sealed this
Third Day of May, 2011

David J. Kappos
*Director of the United States Patent and Trademark Office*